US012145375B2

(12) United States Patent
Nagumo et al.

(10) Patent No.: US 12,145,375 B2
(45) Date of Patent: Nov. 19, 2024

(54) RECORDING APPARATUS AND LIQUID ACCOMMODATION BODY

(71) Applicant: SEIKO EPSON CORPORATION, Tokyo (JP)

(72) Inventors: Takaho Nagumo, Shiojiri (JP); Kazuaki Takahashi, Shiojiri (JP); Ichiro Yoshioka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 119 days.

(21) Appl. No.: 17/664,343

(22) Filed: May 20, 2022

(65) Prior Publication Data

US 2022/0371328 A1 Nov. 24, 2022

(30) Foreign Application Priority Data

May 24, 2021 (JP) ................................ 2021-086726

(51) Int. Cl.
*B41J 2/175* (2006.01)

(52) U.S. Cl.
CPC ....... *B41J 2/17566* (2013.01); *B41J 2/17553* (2013.01); *B41J 2002/17576* (2013.01)

(58) Field of Classification Search
CPC ................ B41J 2/17566; B41J 2/17553; B41J 2002/17576; B41J 2002/17573; B41J 2/17509; B41J 2/17513; B41J 2/17523; B41J 29/13
USPC ........................................................... 347/86
See application file for complete search history.

(56) References Cited

U.S. PATENT DOCUMENTS

2002/0033855 A1* 3/2002 Kubota .................... B41J 2/195 347/7
2011/0234716 A1* 9/2011 Kubo ..................... B41J 2/1752 347/86
2014/0104347 A1 4/2014 Iizawa
2018/0056662 A1* 3/2018 Shinoda ............... B41J 2/17513
2018/0111377 A1* 4/2018 Kimura .................. B41J 2/1752

FOREIGN PATENT DOCUMENTS

JP 2011201215 A 10/2011
JP 2016182834 A 10/2016

* cited by examiner

*Primary Examiner* — Jason S Uhlenhake
*Assistant Examiner* — Alexander D Shenderov
(74) *Attorney, Agent, or Firm* — CHIP LAW GROUP

(57) ABSTRACT

A recording apparatus 101 includes a liquid storage portion 46 configured to store liquid, a recording head 22 that ejects liquid supplied from the liquid storage portion 46 onto the medium, and a light emitting unit 301 configured to emit light, wherein the liquid storage portion 46 has a float 48 configured to float on liquid in the liquid storage portion 46 and to move according to movement of liquid surface LS while maintaining a posture, and a front surface 43F in which the liquid in the liquid storage portion 46 is visually checkable from outside the liquid storage portion 46, wherein the float 48 has a front surface 48*a* that by receiving the light from the light emitting unit 301, appears luminous when viewed from a direction facing the front surface 43F.

7 Claims, 15 Drawing Sheets

RECORDING APPARATUS AND LIQUID ACCOMMODATION BODY

The present application is based on, and claims priority from JP Application Serial Number 2021-086726, filed May 24, 2021, the disclosure of which is hereby incorporated by reference herein in its entirety.

BACKGROUND

1. Technical Field

The present disclosure relates to a recording apparatus and a liquid accommodation body.

2. Related Art

JP-A-2016-182834 discloses an inkjet printer as an example of a recording apparatus that performs recording by ejecting ink, as an example of a liquid, onto a print sheet.

This printer includes a recording head that ejects ink and a liquid accommodation body that has a liquid storage portion that stores the ink to be supplied to the recording head.

In addition, the printer includes a light emitting unit that illuminates the inside of the liquid storage portion.

However, in the printer and the liquid accommodation body described in JP-A-2016-182834, when the inside of the liquid storage portion is illuminated by the light emitting unit, the liquid level of the ink in the liquid storage portion may be difficult to recognize.

SUMMARY

A recording apparatus includes a liquid storage portion configured to store liquid, a recording head that ejects liquid supplied from the liquid storage portion onto a medium, and a light emitting unit configured to emit light, wherein the liquid storage portion has a float configured to float on the liquid in the liquid storage portion and to move according to movement of a liquid surface while maintaining a posture, and a visual check surface through which the liquid in the liquid storage portion is visually checkable from outside the liquid storage portion, wherein the float has a light emitting surface that by receiving light from the light emitting unit, appears luminous when viewed from a direction facing the visual check surface.

A liquid accommodation body includes a liquid storage portion configured to store liquid, a float configured to float on the liquid in the liquid storage portion and to move according to movement of a liquid surface while maintaining a posture, a visual check surface through which the liquid in the liquid storage portion is visually checkable from outside the liquid storage portion, and a light emitting unit provided inside the float, wherein the float has a light emitting surface that, due to the light emitting unit emitting light, appears luminous when viewed from a direction facing the visual check surface.

A liquid accommodation body configured to be mounted to a mounting section of the recording apparatus, the recording apparatus including a recording head configured to eject liquid, a light emitting unit configured to emit light, and the mounting section, the liquid accommodation body includes a liquid storage portion configured to store the liquid, a float configured to float on the liquid in the liquid storage portion and to move according to movement of a liquid surface while maintaining a posture and a visual check surface through which the liquid in the liquid storage portion is visually checkable from outside the liquid storage portion, wherein in a state of being mounted in the mounting section, a region of the liquid storage portion facing the light emitting unit is transparent or translucent, and the float has a light emitting surface that, by receiving light from the light emitting unit, appears luminous when viewed from a direction facing the visual check surface.

DESCRIPTION OF EMBODIMENTS

Figure 1:
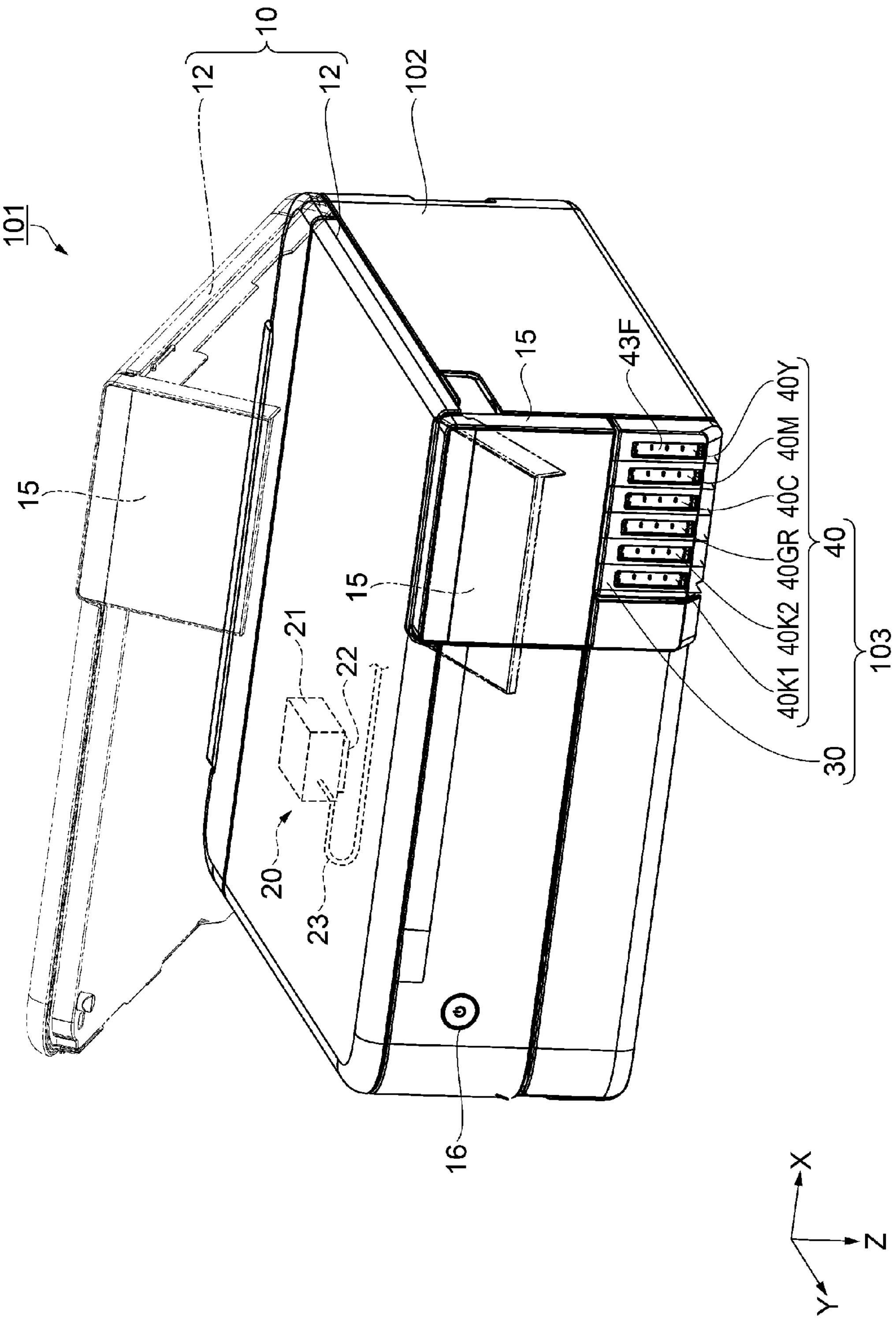
FIG. 1 is a perspective view of a recording apparatus according to a first embodiment of the present disclosure.

Hereinafter, the present disclosure will be described based on embodiments.

In each figure, the same members are denoted by the same reference numerals, and redundant descriptions will be omitted.

In each figure, X, Y, and Z represent three spatial axes orthogonal to each other.

In this specification, directions along these axes are referred to as an X-axis direction, a Y-axis direction, and a Z-axis direction.

In a case where the direction is specified, a positive direction is set as "+", a negative direction is set as "−", positive and negative signs are used together for direction notation, a direction in which an arrow in each drawing is directed is set as a + direction, and a direction opposite to the arrow is set as a − direction.

The Z-axis direction indicates a vertical direction, the +Z direction indicates a vertically downward direction, and the −Z direction indicates a vertically upward direction.

In addition, a plane including the X-axis and the Y-axis will be described as an X-Y plane, a plane including the X-axis and the Z-axis will be described as an X-Z plane, and a plane including the Y-axis and the Z-axis will be described as a Y-Z plane.

Further, the X-Y plane is a horizontal plane. Further, the three spatial-axes of X, Y, and Z, that do not limit positive or negative direction, are described as the X-axis, the Y-axis, and the Z-axis.

1. First Embodiment

Overall configuration of a recording apparatus 101 according to a first embodiment will be described with reference to FIGS. 1 to 3.

The recording apparatus 101 according to the present embodiment includes an apparatus main body 102 having a rectangular parallelepiped shape, a scanner unit 10 attached to an upper portion of the apparatus main body 102, and a liquid accommodation unit 103, and is placed on a horizontal surface.

Note that the width direction of the medium, which intersects the transport direction in which the medium is transported, is the +X direction or the −X direction along the X-axis, and the transport direction in which the medium is transported is the +Y direction along the Y-axis.

Figure 2:
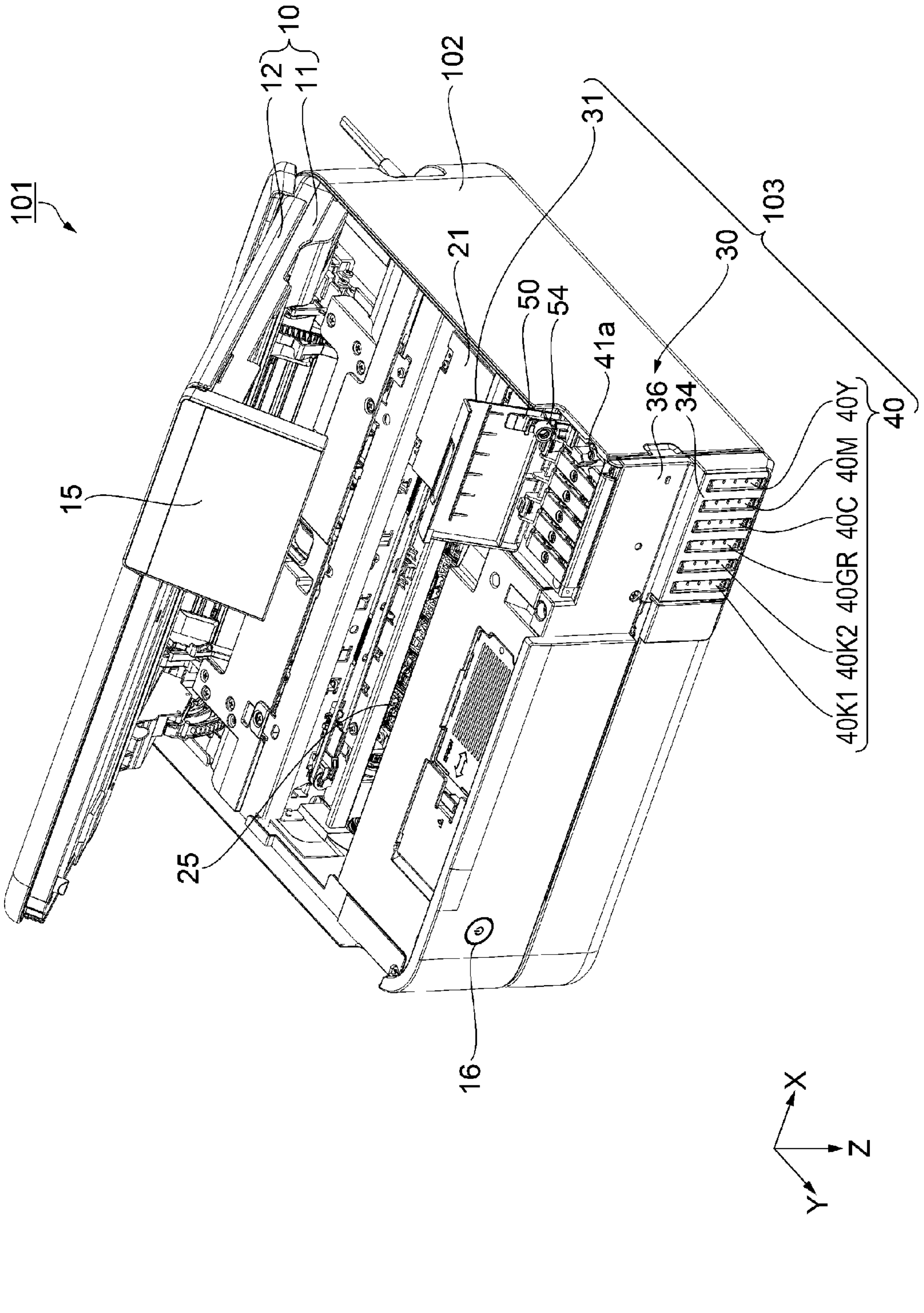
FIG. 2 is a perspective view of the recording apparatus with a scanner unit opened.

As shown in FIGS. 1 and 2, the scanner unit 10 is disposed at an upper portion of the apparatus main body 102 and is pivotably attached to the apparatus main body 102.

In the scanner unit 10, a scanner housing 11 on which a document is placed and which reads the document and a document cover 12 are stacked in this order.

The document cover 12 is a cover that protects the scanner housing 11 and is pivotable with respect to the scanner housing 11.

Further, a display unit 15 is attached to the +Y direction end of the document cover 12.

As shown by solid line and two-dot chain line in FIG. 1, the display unit 15 can pivot together with the document cover 12 with respect to the scanner housing 11, and can tilt with respect to the document cover 12.

That is, the display unit 15 is attached to an end of the scanner unit 10, is pivotable together with the scanner unit 10, and is tiltable.

The display unit 15 is configured by a liquid crystal display module with a touch panel function.

The display unit 15 has a function as a notification unit that shows a guidance display for an operation of the recording apparatus 101 and information related to the recording apparatus 101, and a function as an operation unit that performs various settings for the recording apparatus 101.

The user tilts the display unit 15 to an easily viewable position, and can perform various operations of the recording apparatus 101 while referring to the image displayed on the display unit 15.

Further, the user can tilt the display unit 15 to a position where the user can easily touch it, and perform various settings of the recording apparatus 101 via the display unit 15.

Figure 3:
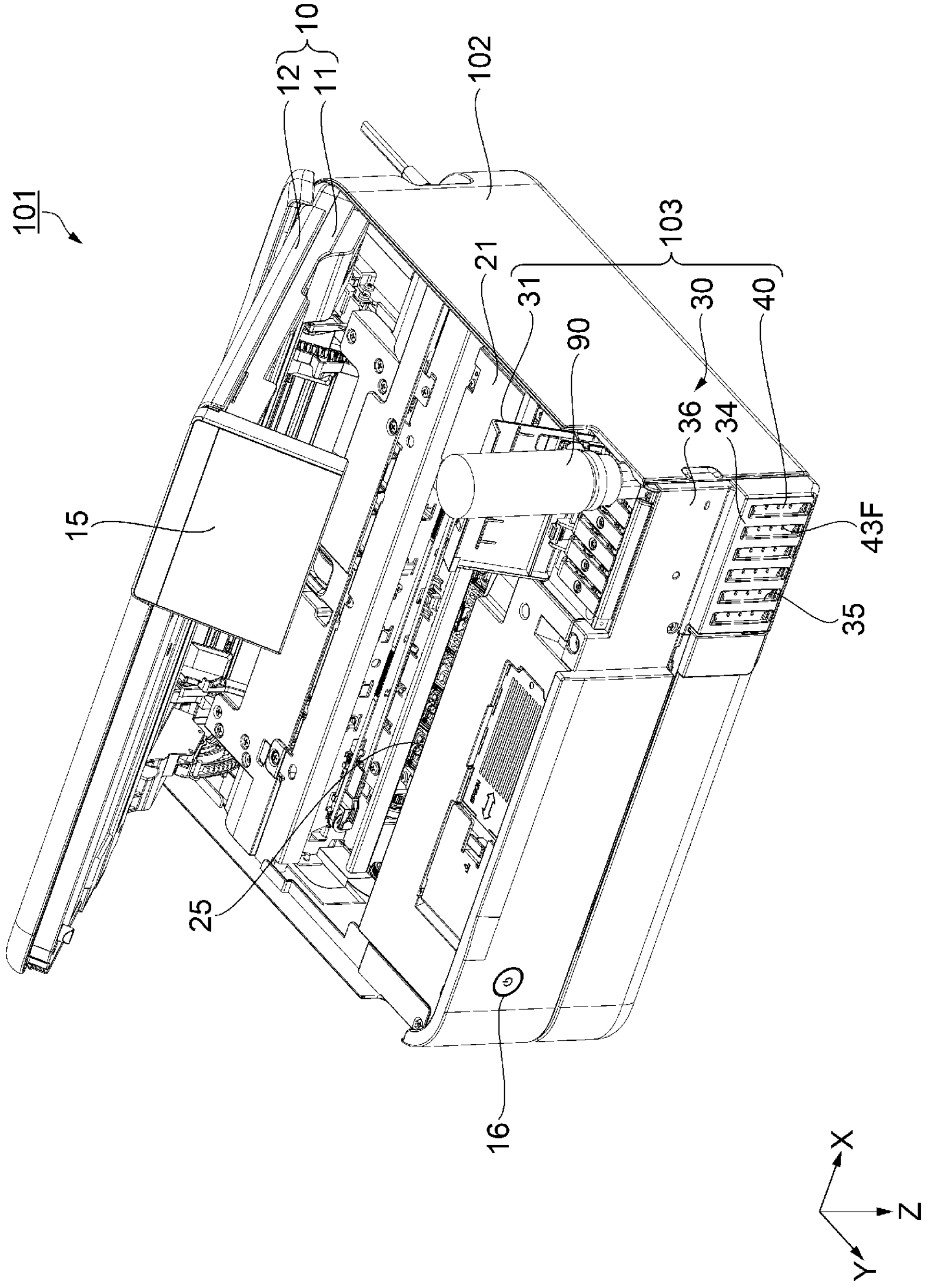
FIG. 3 is another perspective view of the recording apparatus with the scanner unit opened.

Furthermore, as shown in FIG. 3, by pivoting the display unit 15 together with the scanner unit 10 and opening the scanner unit 10 to which the display unit 15 is attached with respect to the apparatus main body 102, it is possible to refill a liquid container 40 of the liquid accommodation unit 103 with liquid from a refill container 90.

As shown in FIG. 1, the recording apparatus 101 has a power supply operation unit 16 on the front surface of the apparatus main body 102.

By operating the power supply operation unit 16, the user can switch between an energized state in which the power supply of the recording apparatus 101 is turned on and a power-off state in which the power supply of the recording apparatus 101 is turned off.

As shown in FIGS. 1 and 2, the recording apparatus 101 includes a transport unit 25 that transports a medium in the apparatus main body 102, and a recording unit 20.

The transport unit 25 transports the medium in the transport direction which is the +Y direction.

The recording unit 20 is configured to be able to record an image on a medium using a liquid.

As shown in FIG. 1, the recording unit 20 includes a carriage 21, a recording head 22 that is mounted on the carriage 21 and that discharges liquid onto a medium, and a tube 23 for supplying liquid to the recording head 22.

The liquid supplied to the recording head 22 is stored in the liquid container 40 of the liquid accommodation unit 103.

The recording head 22 and the liquid container 40 are coupled by the tube 23.

The tube 23 is an example of a liquid supply portion. The recording apparatus 101 includes the recording head 22 that ejects liquid and the liquid container 40. The liquid container 40 is an example of a liquid accommodation body.

The carriage 21 is supported by a guide shaft and is movable in a width direction of the medium, which intersects with a transport direction in which the medium is transported.

The recording head 22 is movable in the width direction of the medium together with the carriage 21.

The recording head 22 ejects liquid onto a medium and includes a common liquid chamber, individual liquid chambers, ejection elements, and nozzles, none of which are shown.

The recording apparatus 101 according to the present embodiment records a desired image on a medium by alternately repeating an operation in which the recording head 22 ejects liquid onto the medium while moving in the width direction of the medium and an operation in which the medium is transported in the transport direction by the transport unit 25.

Next, the liquid accommodation unit 103 will be described.

Figure 4:
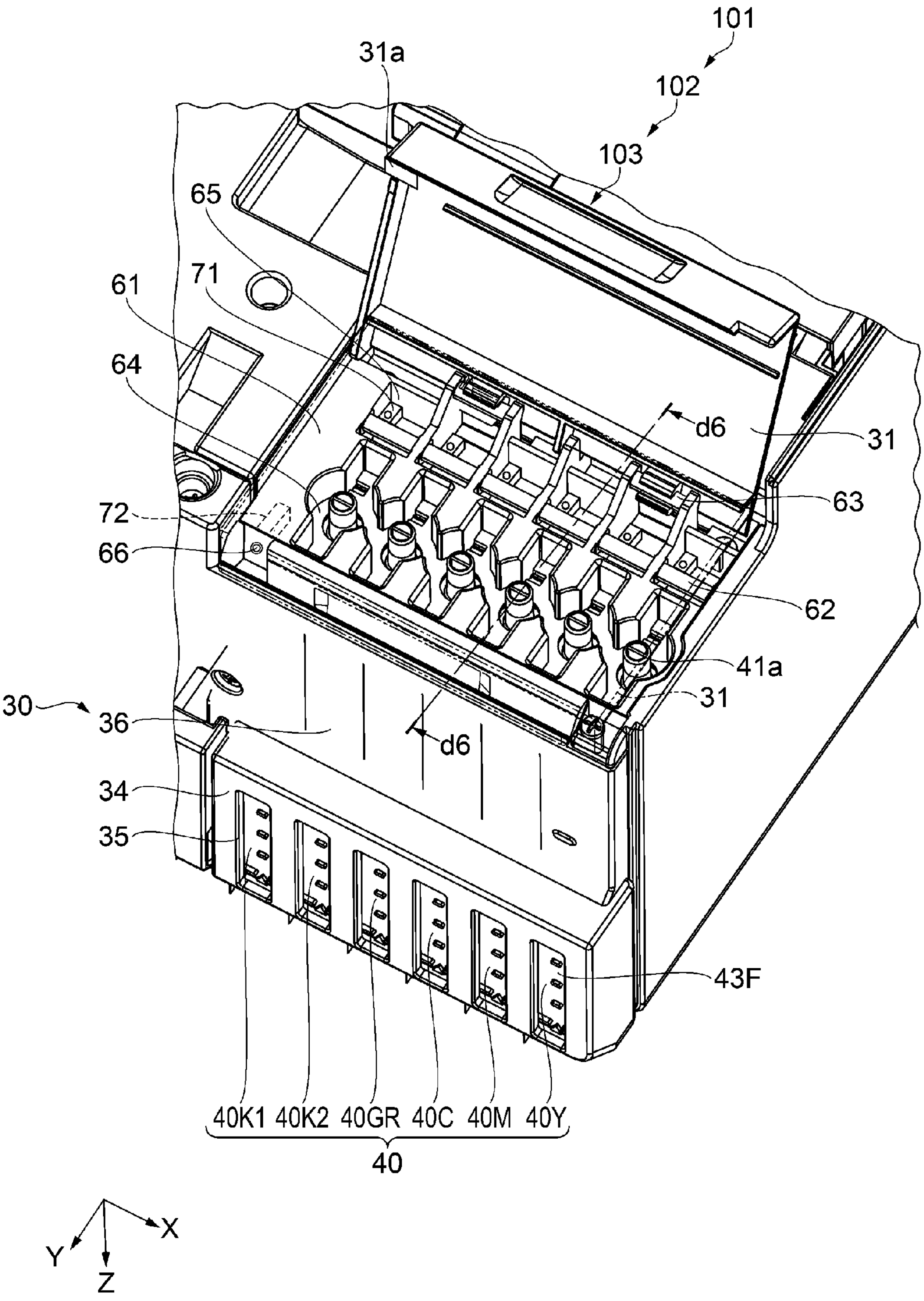
FIG. 4 is a perspective view of a liquid accommodation unit.
Figure 5:
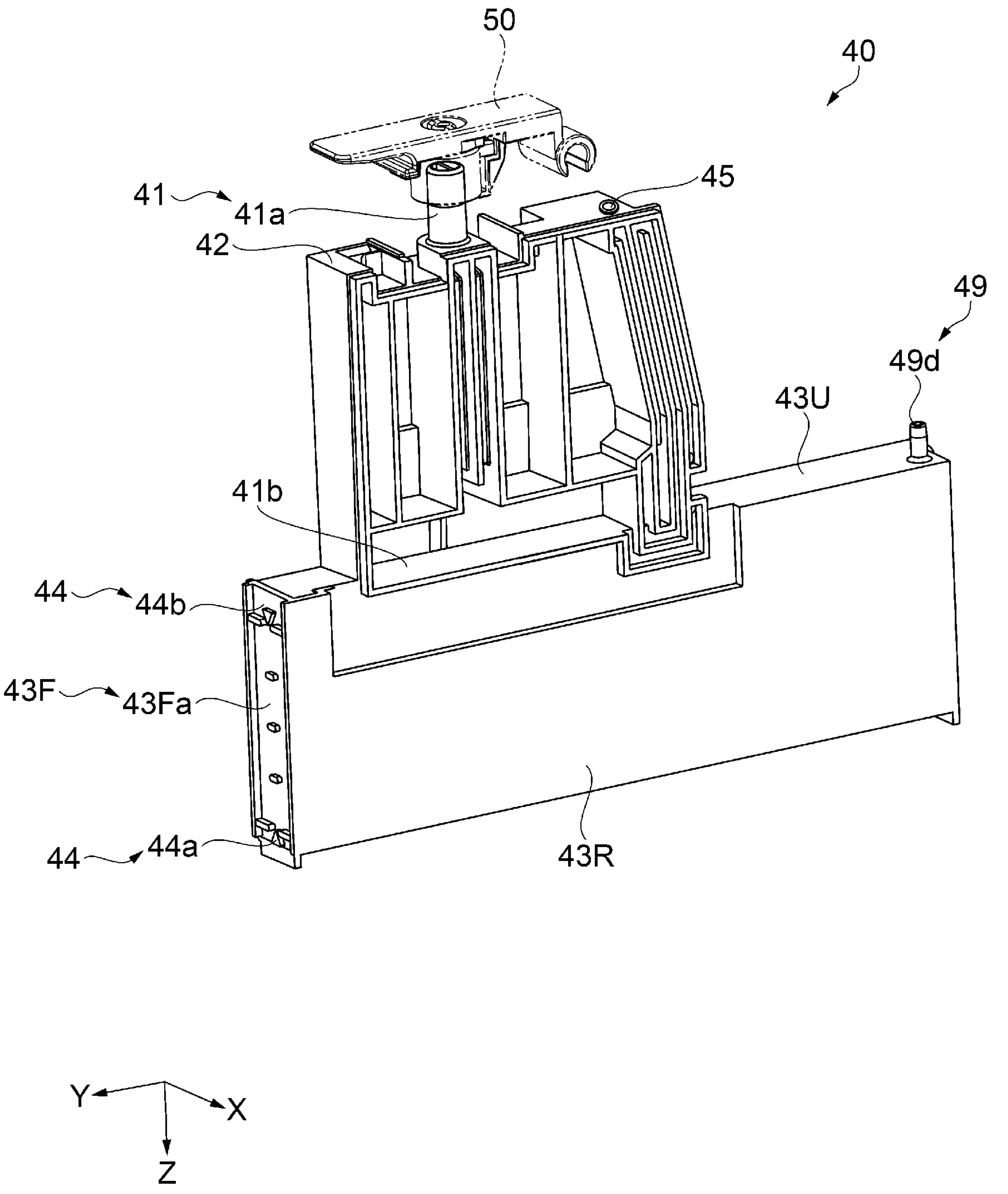
FIG. 5 is a perspective view of a liquid container.
Figure 8:
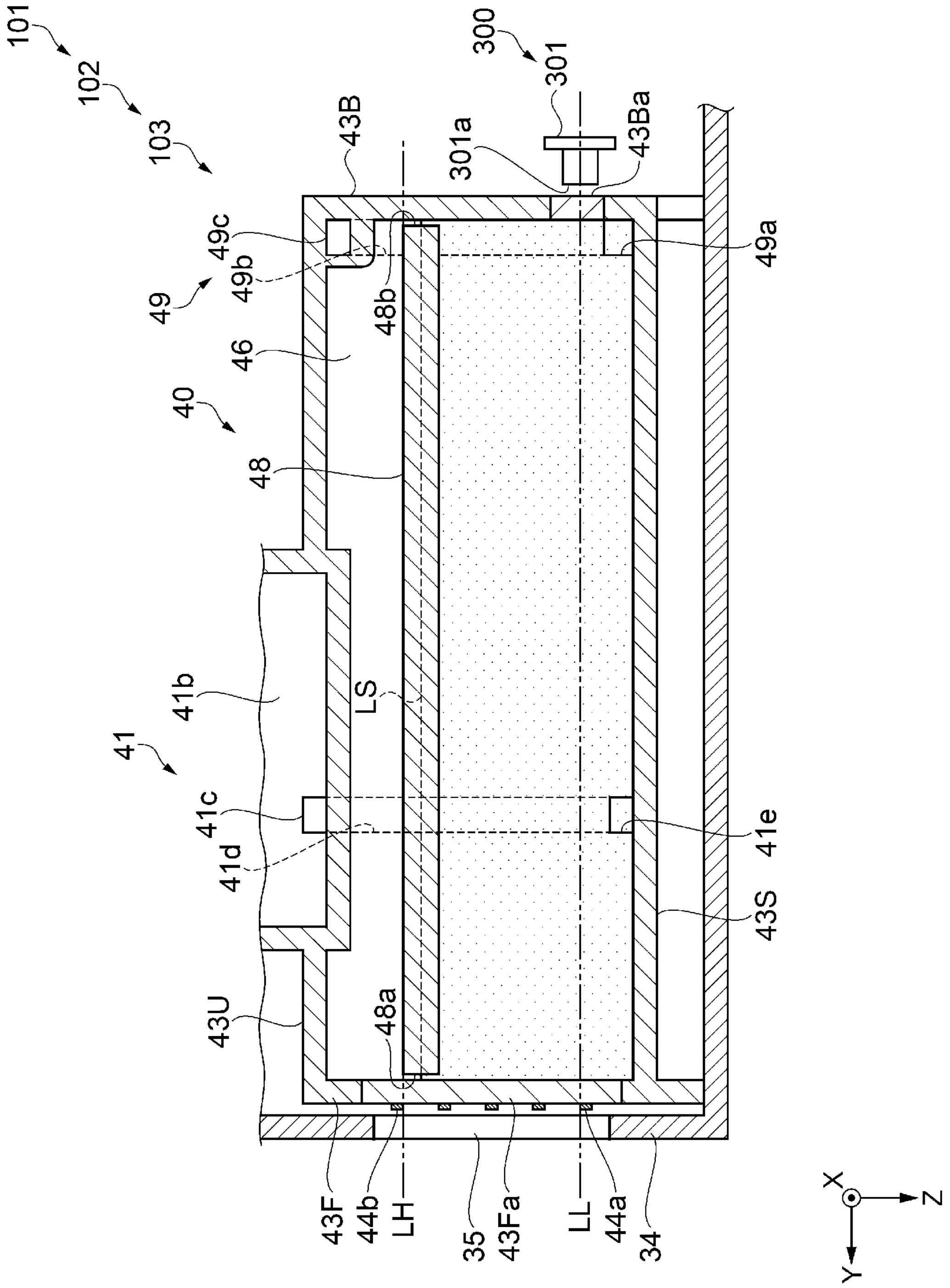
FIG. 8 is a main-part cross-sectional view of a liquid storage portion.

As shown in FIGS. 4, 5, and 8, the liquid accommodation unit 103 includes the liquid container 40 capable of storing liquid, an illumination unit 300, a housing 30 in which the liquid container 40 is stored, an upper wall portion 61, an opening and closing cover 31, a cap lever 50, an opening and closing detection unit 71, and a lock mechanism 72.

Note that in FIG. 4, the cap lever 50, which is a component of the liquid accommodation unit 103, is not shown.

In FIG. 5, the cap lever 50 is indicated by a two-dot chain line.

As shown in FIG. 4, six liquid containers 40 are housed in the housing 30.

The six liquid containers 40 include a liquid container 40K1 containing black liquid containing black pigment as a color material, a liquid container 40K2 containing black liquid containing black dye as a color material, a liquid container 40GR containing gray liquid containing gray dye as a color material, a liquid container 40C containing cyan liquid containing cyan pigment as a color material, a liquid container 40M containing magenta liquid containing magenta pigment as a color material, and a liquid container 40Y containing yellow liquid containing yellow pigment as a color material.

The liquid container 40K1, the liquid container 40K2, the liquid container 40GR, the liquid container 40C, the liquid container 40M, and the liquid container 40Y are arranged in this order in the +X direction.

The number of liquid containers 40 housed in the housing 30 is not limited to six, and may be fewer than six, one, or more than six.

The color material contained in the liquid stored in the liquid container 40 may be a pigment or a dye.

Further, the liquid contained in the liquid container 40 may be a liquid that does not contain a coloring material.

As shown in FIG. 5, a top surface 42 of the liquid container 40 is provided with an injection port 41*a* through which the liquid can be injected from the refill container 90, and an atmosphere introduction port 45.

The atmosphere introduction port 45 communicates with an intermediate storage portion 41*b* and can introduce air into the intermediate storage portion 41*b*.

Further, as shown in FIG. 8, the liquid container 40 includes a liquid storage portion 46 that is located in the +Z direction with respect to the top surface 42 and that is capable of storing liquid.

Figure 10:
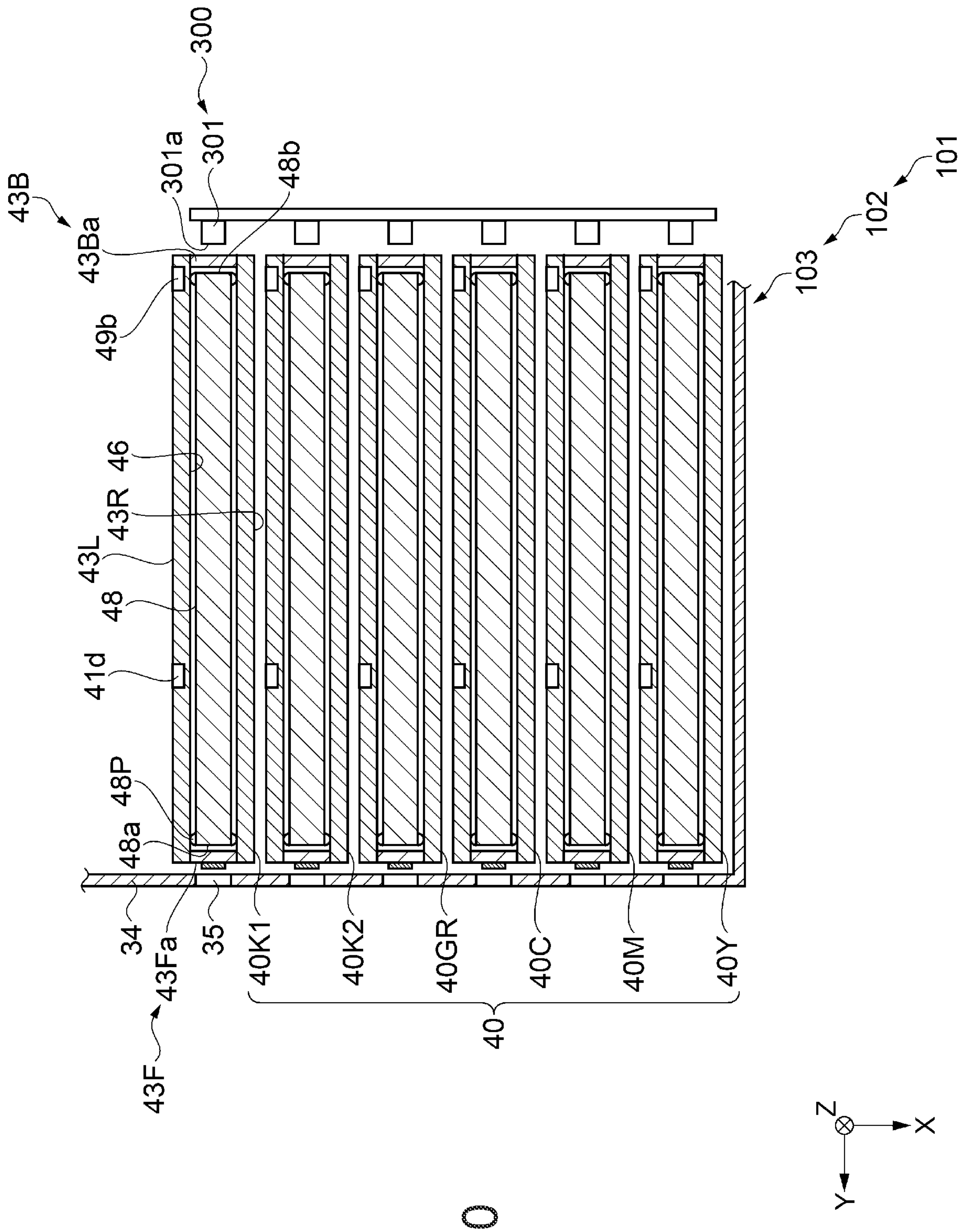
FIG. 10 is a main-part cross-sectional view showing a d10-d10 cross section of the liquid storage portion shown in FIG. 9.

As shown in FIGS. 8 and 10, the liquid storage portion 46 has a front surface 43F, a rear surface 43B, a bottom surface 43S, an upper surface 43U, a right side surface 43R, and a left side surface 43L.

The front surface 43F is a wall surface defining an outer shape on the +Y direction side of the liquid storage portion 46.

The rear surface 43B is a wall surface defining an outer shape on the −Y direction side of the liquid storage portion 46.

The bottom surface 43S is a wall surface defining an outer shape on the +Z direction side of the liquid storage portion 46.

The upper surface 43U is a wall surface defining an outer shape on the −Z direction side of the liquid storage portion 46.

The right side surface 43R is a wall surface defining an outer shape on the +X direction side of the liquid storage portion 46.

The left side surface 43L is a wall surface defining an outer shape on the −X direction side of the liquid storage portion 46.

Liquid can be injected into the liquid storage portion 46 via an injection portion 41 including the injection port 41*a*.

As shown in FIGS. 5 and 8, the injection portion 41 includes the injection port 41*a*, the intermediate storage portion 41*b*, an inlet 41*c*, a relay flow path 41*d*, and an outlet 41*e*.

The intermediate storage portion 41*b* is located between the injection port 41*a* and the liquid storage portion 46 in the Z-axis direction and communicates with the injection port 41*a*.

As shown in FIGS. 8 and 10, the relay flow path 41*d* is provided on the left side surface 43L of the liquid storage portion 46, includes the inlet 41*c* opened on the side surface of the intermediate storage portion 41*b* on the −X direction side and the outlet 41*e* opened on the left side surface 43L of the liquid storage portion 46, and brings the intermediate storage portion 41*b* and the liquid storage portion 46 into communication with each other.

Figure 9:
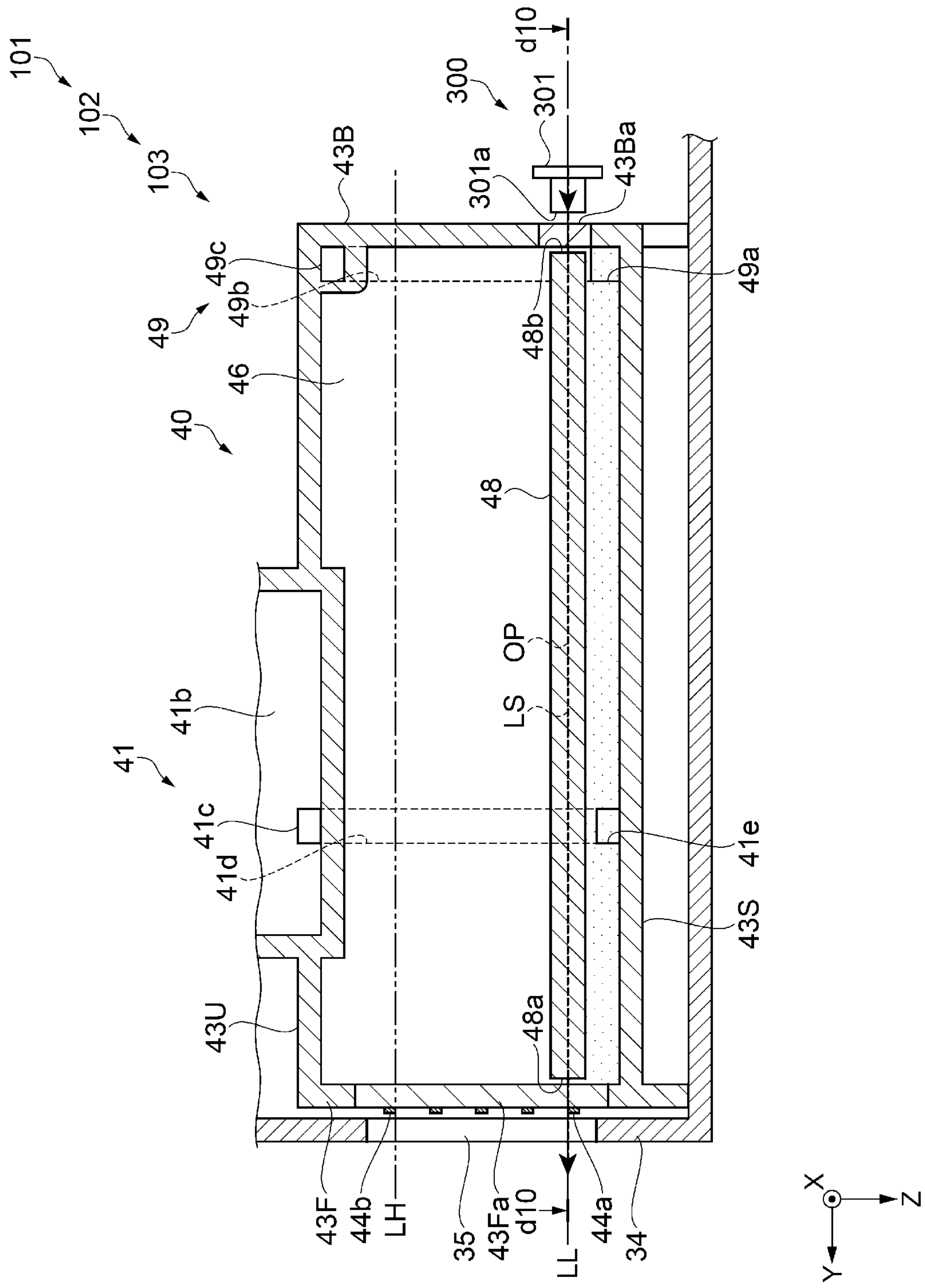
FIG. 9 is a main-part cross-sectional view of the liquid storage portion when the amount of liquid has reached a lower limit amount.

As shown in FIG. 9, the outlet 41*e* is opened at a position in the +Z direction from the upper surface of a float 48 when the liquid amount in the liquid storage portion 46 is a lower limit amount, to be described later.

Accordingly, it is possible to reduce the frequency at which liquid adheres to the upper surface of the float 48.

As shown in FIG. 5, a delivery port 49*d* for coupling with the tube 23 is provided on the upper surface 43U of the liquid storage portion 46.

The liquid in the liquid storage portion 46 is supplied to the recording head 22 via the tube 23 and a lead-out flow path 49, which includes the delivery port 49*d*.

Accordingly, the recording head 22 ejects the liquid supplied from the liquid storage portion 46 to the medium.

As shown in FIGS. 5 and 8, the lead-out flow path 49 is constituted by a discharge port 49*a*, a first connection flow path 49*b*, a second connection flow path 49*c*, and the delivery port 49*d*.

As shown in FIG. 10, the first connection flow path 49*b* is provided on the left side surface 43L of the liquid storage portion 46 and includes the discharge port 49*a* which is opened on the left side surface 43L.

The discharge port 49*a* discharges the liquid from the liquid storage portion 46 to the lead-out flow path 49.

As shown in FIG. 8, the second connection flow path 49*c* is provided on the +Z direction side of the upper surface 43U of the liquid storage portion 46 and couples the first connection flow path 49*b* and the delivery port 49*d* to each other.

Note that the liquid storage portion 46 communicates with the atmosphere introduction port 45 via the intermediate storage portion 41*b*.

As shown in FIG. 9, the discharge port 49*a* is opened at a position in the +Z direction from the upper surface of the float 48 when the liquid amount in the liquid storage portion 46 is at a lower limit amount, to be described later.

Accordingly, it is possible to reduce the frequency at which liquid adheres to the upper surface of the float 48.

As shown in FIGS. 5 and 8, a window member 43Fa is provided on the front surface 43F of the liquid storage portion 46.

The window member 43Fa is made of a translucent or transparent material, so that a visual check of the liquid stored in the liquid storage portion 46 and a liquid surface LS of the liquid can be made from outside the liquid storage portion 46.

The window member 43Fa is an example of a visual check surface.

If the material constituting the window member 43Fa is a resin material, polypropylene (PP), polyethylene (PE), polyamide (PA), polyethylene terephthalate (PET), or the like can be adopted.

The visual check surface in the present embodiment is a surface along the X-Z plane.

The window member 43Fa is provided with a scale portion 44 including a mark 44*a* which indicates the lower limit amount of the liquid and a mark 44*b* which indicates the upper limit amount of the liquid.

The lower limit amount of the present embodiment is a liquid amount when the liquid in the liquid storage portion 46 becomes very small, and is a liquid amount for which replenishment of the liquid to the liquid container 40 is desirable.

The upper limit amount in the present embodiment is an amount of liquid that does not require refilling the liquid container 40, and some air is in the liquid storage portion 46.

The lower limit amount and the upper limit amount are examples of a predetermined amount.

In FIGS. 8 and 9, a lower limit liquid level LL, which is the liquid surface LS when the liquid amount of the liquid is the lower limit amount, and an upper limit liquid level LH, which is the liquid surface LS when the liquid amount of the liquid is the upper limit amount, are indicated by two-dot chain lines.

If the liquid storage portion 46 is formed of a translucent or transparent material, the window member 43Fa may not be provided.

Also, in this case, the user can check the liquid stored in the liquid storage portion 46 and the liquid surface LS from the outside of the liquid storage portion 46 via the front surface 43F.

Thus, the front surface 43F is an example of a visual check surface.

In other words, the liquid storage portion 46 has the front surface 43F that enables a visual check of the liquid in the liquid storage portion 46 from outside the liquid storage portion 46.

As shown in FIGS. 8 to 10, the liquid storage portion 46 includes the float 48.

Note that FIG. 10 is a main-part cross-sectional view when the amount of liquid in each liquid storage portion 46 of the six liquid containers 40 is at the lower limit amount.

The float 48 floats on the liquid in the liquid storage portion 46 and moves according to the movement of the liquid surface LS in the Z-axis direction.

The float 48 of the present embodiment is made of a material having a lower specific gravity than the liquid stored in the liquid storage portion 46.

As a material constituting the float 48, for example, polypropylene (PP) or polyethylene (PE) can be adopted.

As shown in FIG. 10, when viewed from the Z-axis direction, the float 48 of the present embodiment has a rectangular thin plate shape in which the Y-axis direction is the longitudinal direction and the X-axis direction is the short direction.

Further, the float 48 of the present embodiment is made of a translucent or transparent material.

The refractive index of the material constituting the float 48 is greater than the refractive index of the atmosphere and greater than the refractive index of the liquid stored in the liquid storage portion 46.

Therefore, the float 48 has a function as a so-called light guiding member for guiding light entering from a rear surface 48*b*, which is a side surface on the −Y direction side of the float 48, to a front surface 48*a*, which is a side surface on the +Y direction side of the float 48.

Therefore, each side surface defining the outer shape of the float 48 can be said to be a light guide surface for guiding light.

It can also be said that the rear surface 48*b*, the front surface 48*a*, and each side surface defining the outer shape of the float 48 are translucent or transparent.

The refractive index of the material constituting the float 48 is preferably 1.4 or more, and more preferably 1.5 or more, for example.

When viewed in the Z-axis direction, a gap is secured between the side surfaces of the float 48 and the inner surface of the liquid storage portion 46.

Further, hemispherical protrusions 48P are provided on the side surfaces of the float 48 on the +X direction side and the −X direction side.

According to this, even if the inner surfaces of the liquid storage portion 46 on the +X direction side and the −X direction side deform, it is possible to suppress an increase in the sliding resistance between the float 48 and the inner surface of the liquid storage portion 46.

Therefore, the float 48 of the present embodiment does not have a structure that holds the float 48 rotatable about a rotation shaft provided in the liquid storage portion 46.

Therefore, as shown in FIGS. 8 and 9, the float 48 of the present embodiment moves in accordance with the movement of the liquid surface LS in the Z-axis direction while maintaining a posture in which the upper surface, which is the side surface on the −Z direction side of the float 48, follows the liquid surface LS.

Further, the float 48 of the present embodiment floats on the liquid in the liquid storage portion 46.

As a result, the upper surface of the float 48, which is the side surface on the −Z direction side of the float 48, is positioned in the −Z direction with respect to the liquid surface LS.

Further, a part of the front surface 48*a* of the float 48 is positioned in the −Z direction with respect to the liquid surface LS.

Further, a part of the rear surface 48*b* of the float 48 is positioned in the −Z direction with respect to the liquid surface LS.

In this case, at least a part of the front surface 48*a* of the float 48 can be seen when the inside of the liquid storage portion 46 is viewed from the +Y direction side, which is from the direction facing the front surface 43F of the liquid storage portion 46.

The front surface 48*a* of the float 48 moves in accordance with the movement of the liquid surface LS in the Z-axis direction while maintaining a state along the X-Z plane.

According to this, in the recording apparatus 101 of the present embodiment, for example, even when the liquid surface LS in the liquid storage portion 46 is difficult to see, the position of the liquid surface LS can be confirmed by seeing the front surface 48*a* of the float 48, and thus the liquid amount in the liquid storage portion 46 is easier to confirm compared with a case where the float 48 is not provided in the liquid storage portion 46.

As shown in FIGS. 8 to 10, the illumination unit 300 of the present embodiment is provided outside the liquid storage portion 46.

The illumination unit 300 has a light emitting unit 301 for emitting light.

The light emitting unit 301 emits visible light.

As shown in FIGS. 8 and 9, the light emitting unit 301 is provided at a position on the −Y direction side with respect to the rear surface 43B of the liquid storage portion 46.

The light emitting unit 301 is provided so that the position in the Z-axis direction of a front surface 301*a* which emits light, corresponds to the position of the lower limit liquid level LL of the liquid in the liquid storage portion 46.

The light emitting unit 301 of the present embodiment is attached to the housing 30, but may be attached to the rear surface 43B of the liquid storage portion 46.

As a result, as shown in FIG. 9, when the amount of liquid in the liquid storage portion 46 is the lower limit, the front surface 301*a* of the light emitting unit 301 faces the rear surface 48*b* of the float 48.

In the rear surface 43B of the liquid storage portion 46 of the present embodiment, a window member 43Ba is provided in a region facing the front surface 301*a* of the light emitting unit 301.

The window member 43Ba is made of a translucent or transparent material, and visible light emitted by the light emitting unit 301 enters the liquid storage portion 46 through the window member 43Ba.

As shown in FIG. 10, the illumination unit 300 of the present embodiment has six light emitting units 301 provided side by side in the X-axis direction in correspondence with respective liquid storage portions 46 of the six liquid containers 40.

When the liquid storage portion 46 is formed of a translucent or transparent material, the window member 43Ba may not be provided.

The light emitting unit 301, by emitting visible light, illuminates the inside of the liquid storage portion 46, including the liquid and the float 48, from the outside of the liquid storage portion 46 through the window member 43Ba.

With this configuration, the recording apparatus 101 of the present embodiment facilitates a check of the liquid stored in the liquid storage portion 46 and the liquid surface LS from the outside of the liquid storage portion 46 compared to a case where the illumination unit 300 is not provided.

Further, as shown in FIG. 9, when the amount of liquid in the liquid storage portion 46 is the lower limit amount, light emitted from the front surface 301*a* of the light emitting unit 301 enters the float 48 from the rear surface 48*b* of the float 48.

The rear surface 48*b* of the float 48 is an example of a light entry surface.

The float 48 of the present embodiment has a function as a light guiding member as described above.

Therefore, light from the light emitting unit 301 that entered the float 48 from the rear surface 48*b* of the float 48 is guided through the float 48 toward the front surface 48*a*.

In FIG. 9, an optical path OP of light guided through the float 48 from the rear surface 48*b* toward the front surface 48*a* is indicated by a dashed arrow.

The light guided to the front surface 48*a* of the float 48 passes through the window member 43Fa of the liquid storage portion 46 and reaches the +Y direction side of the liquid storage portion 46, that is, outside the liquid storage portion 46.

As a result, when the inside of the liquid storage portion 46 is viewed from the +Y direction side, which is from a direction facing the front surface 43F of the liquid storage portion 46, the front surface 48*a* of the float 48 appears luminous.

In other words, the float 48 includes the front surface 48*a* which, by receiving light from the light emitting unit 301, appears luminous when the inside of the liquid storage portion 46 is viewed from the +Y direction side, which is from a direction facing the front surface 43F of the liquid storage portion 46.

The front surface 48*a* of the float 48 is an example of a light emitting surface.

By this, the position of the lower limit liquid level LL can be checked by viewing the front surface 48*a* of the float 48, even if the lower limit liquid level LL is difficult to see when the liquid amount in the liquid storage portion 46 is the lower limit amount. Therefore, the recording apparatus 101 of the present embodiment facilitates a check of the liquid stored in the liquid storage portion 46 compared to the case where the float 48 is not provided in the liquid storage portion 46.

As shown in FIG. 4, the housing 30 includes a visual check portion 34 and a wall portion 36.

The visual check portion 34 is provided with a through-hole 35 exposing the front surface 43F of the liquid storage portion 46.

The wall portion 36 is disposed in the −Z direction with respect to the visual check portion 34.

The user can grasp the storage amount of the liquid stored in the liquid storage portion 46 from the through-hole 35 of the visual check portion 34 through the front surface 43F.

Note that, if it is possible to expose the front surface 43F of the liquid storage portion 46, then instead of the through-hole 35, a notch shape may be provided in the visual check portion 34 by removing a part of the visual check portion 34.

Figure 13:
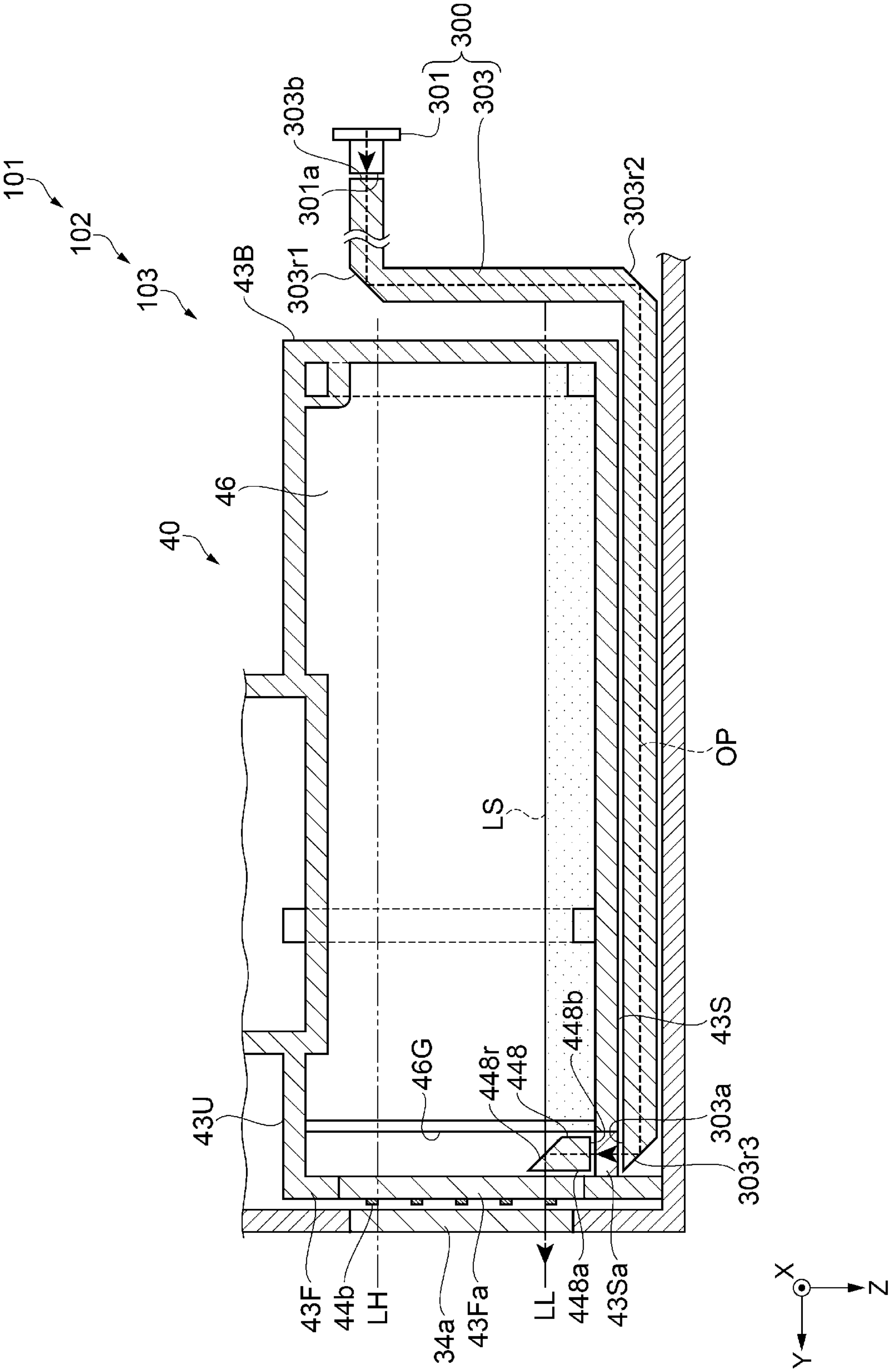
FIG. 13 is a main-part cross-sectional view of a liquid storage portion according to a third embodiment.
Figure 14:
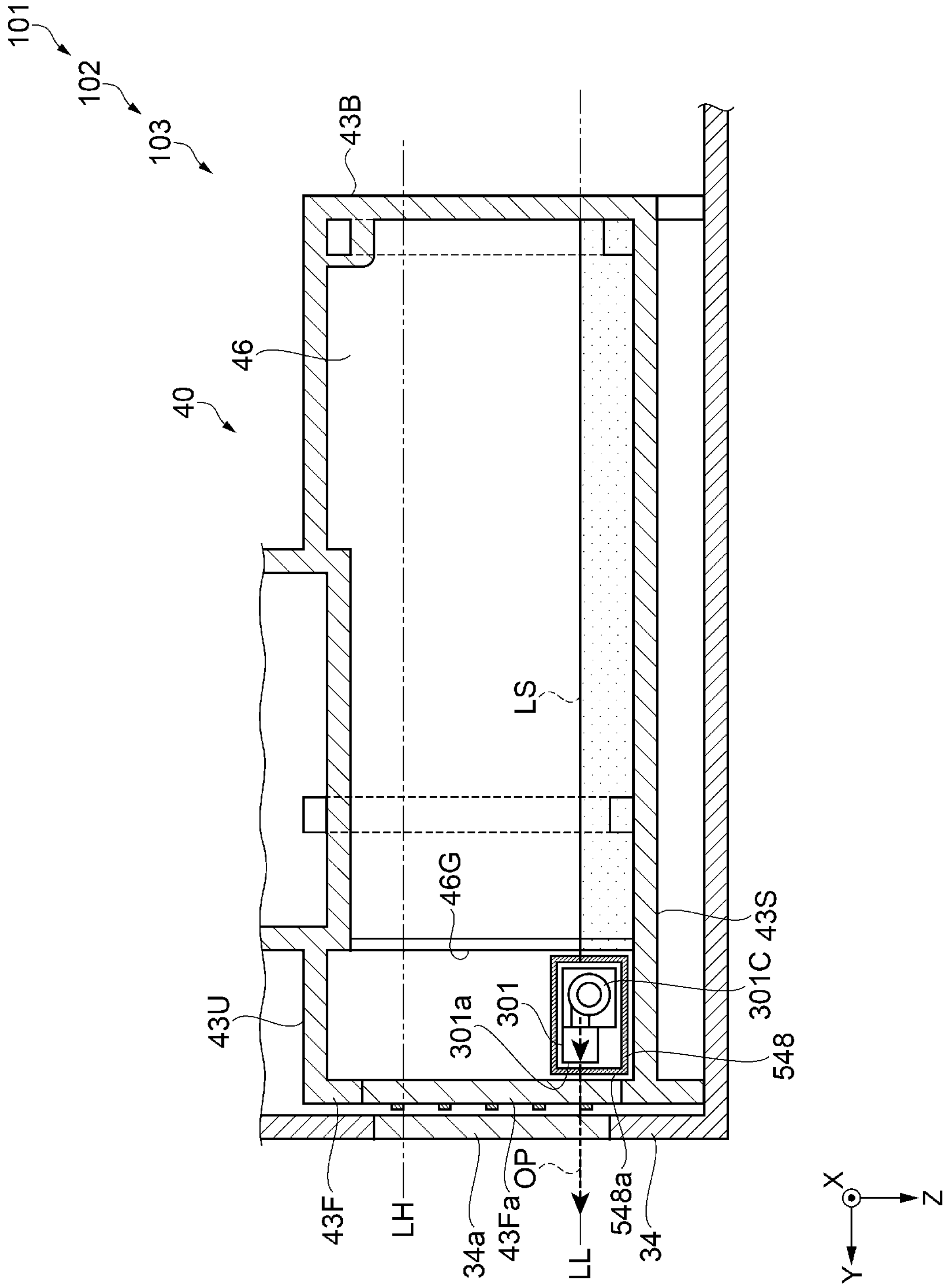
FIG. 14 is a main-part cross-sectional view of a liquid storage portion according to a fourth embodiment.
Figure 15:
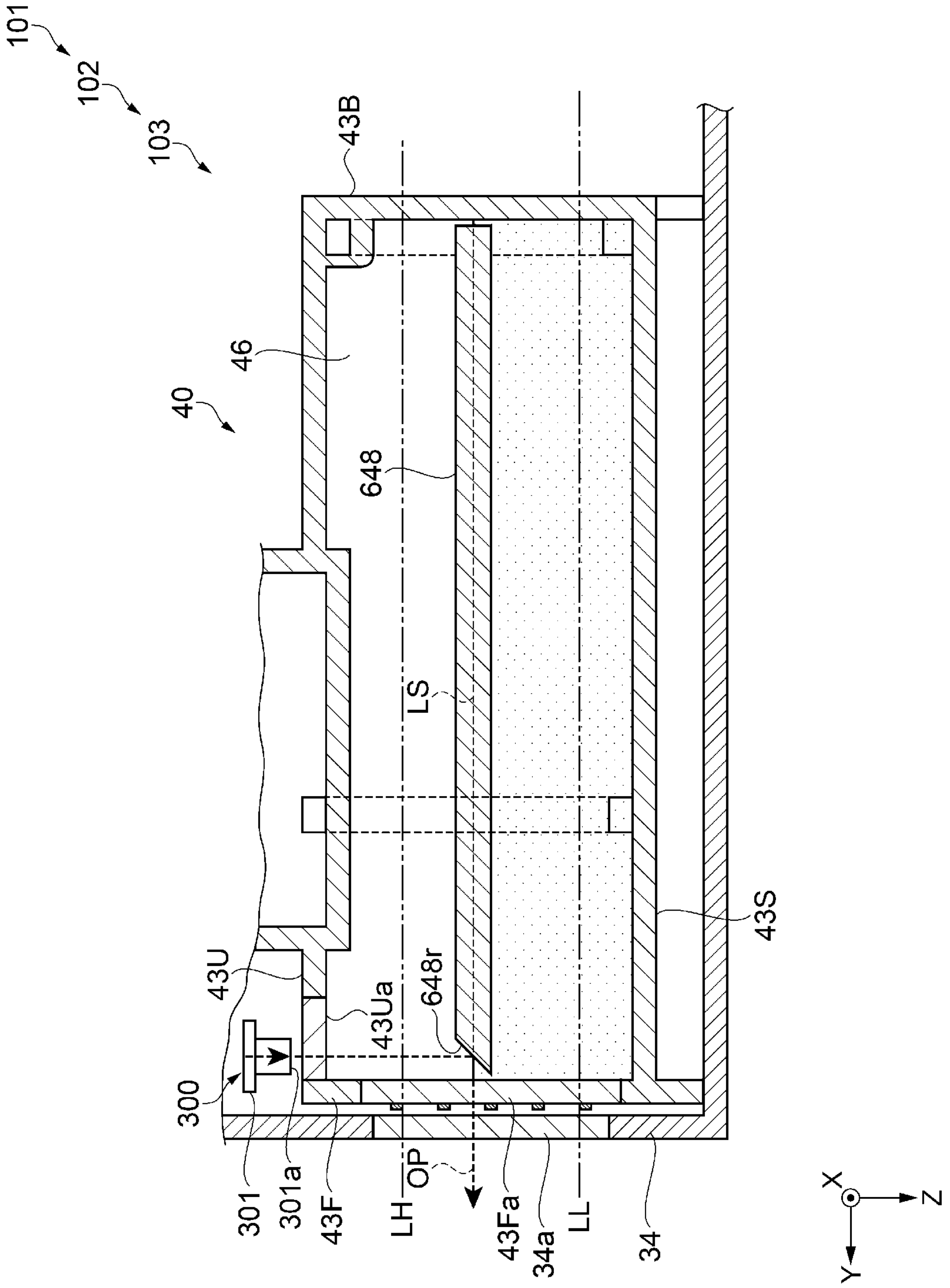
FIG. 15 is a main-part cross-sectional view of a liquid storage portion according to a fifth embodiment.

Note that, as shown in FIGS. 13 to 15, a visual check member 34*a* made of a translucent or transparent material may be provided in the through-hole 35 of the visual check portion 34.

If the material constituting the visual check member 34*a* is a resin material, polypropylene (PP), polyethylene (PE), polyamide (PA), acrylonitrile-butadiene-styrene (ABS), polycarbonate (PC), polyethylene terephthalate (PET), polymethylmethacrylate (PMMA), or the like can be adopted.

As shown in FIG. 4, the upper wall portion 61 includes, corresponding to the six liquid containers 40, six cap lever mounting sections 62, opening and closing cover mounting sections 63, first recesses 64, second recesses 65, and lock pin projection holes 66.

The cap lever mounting section 62 is a columnar shaft extending along the X-axis.

The opening and closing cover mounting section 63 is a columnar shaft extending along the X-axis.

One end of the opening and closing cover 31 is engaged with the opening and closing cover mounting section 63, so that the opening and closing cover 31 is rotatable about the opening and closing cover mounting section 63.

Figure 6:
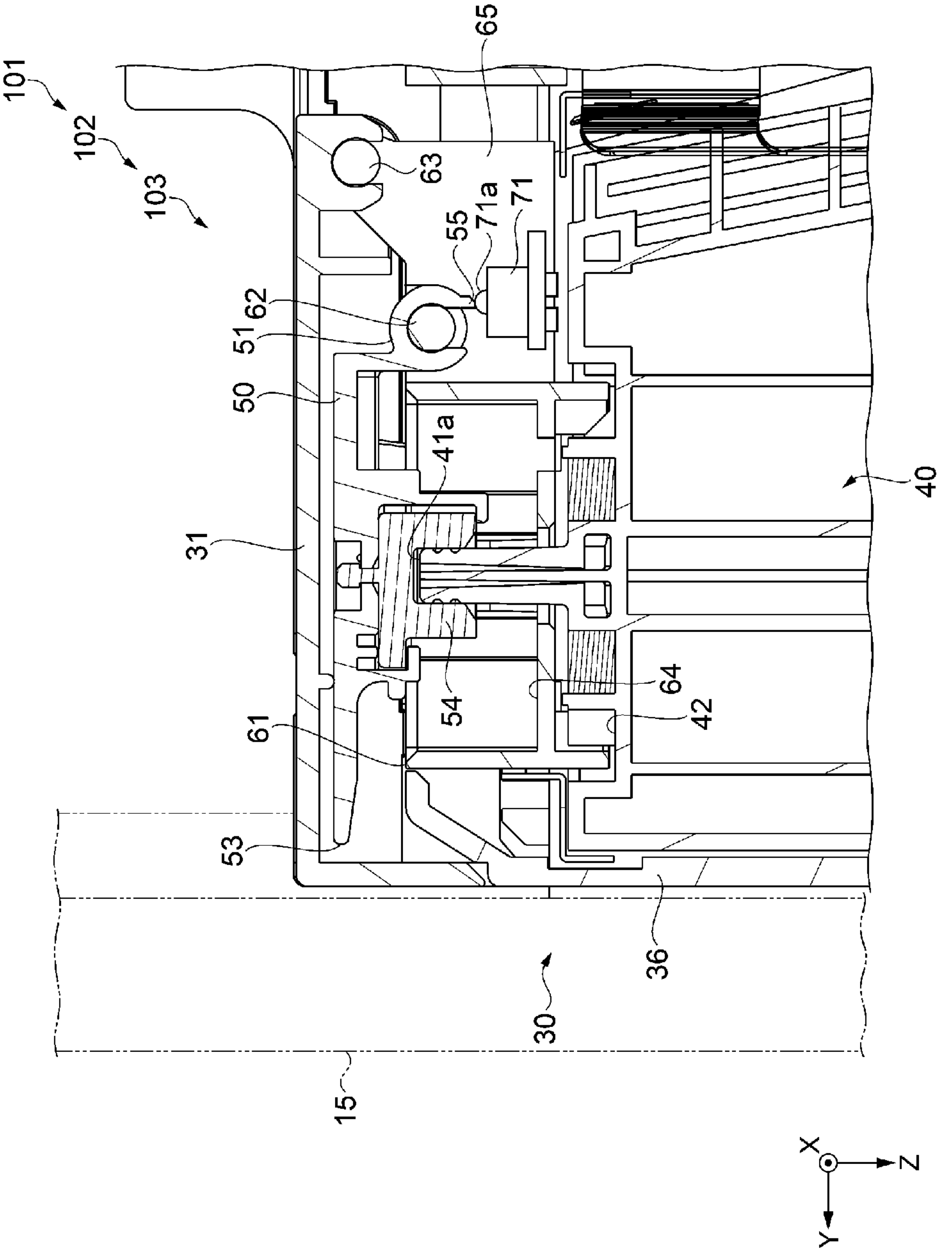
FIG. 6 is a main-part cross-sectional view showing a d6-d6 cross section of the liquid accommodation unit shown in FIG. 4, when the opening and closing cover and a cap lever are in a closed state.
Figure 7:
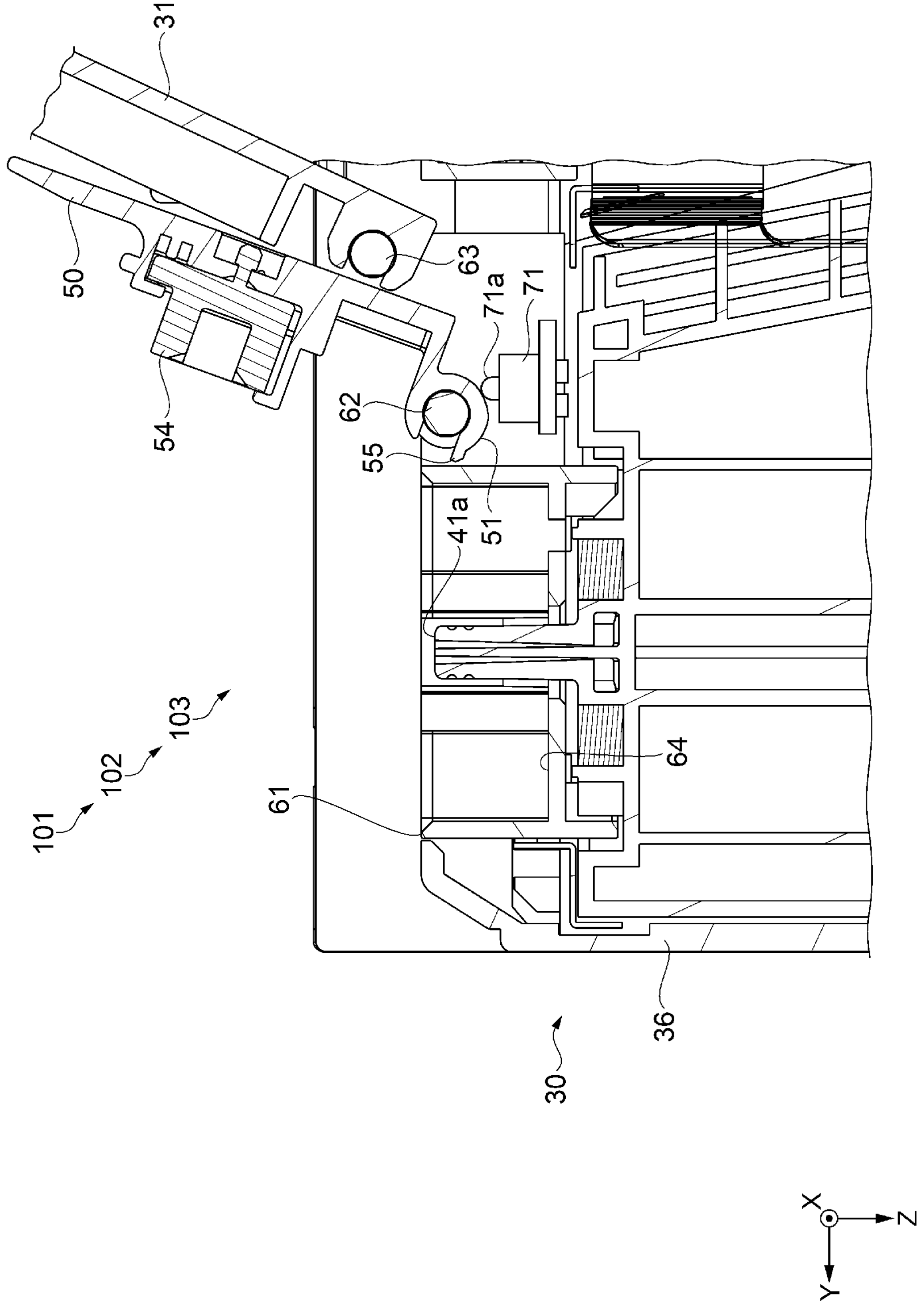
FIG. 7 is a main-part cross-sectional view showing a d6-d6 cross section of the liquid accommodation unit shown in FIG. 4, when the opening and closing cover and the cap lever are in an opened state.

As shown in FIGS. 6 and 7, the cap lever 50 has an end 53, an engagement portion 51, a cap 54 capable of closing the injection port 41*a*, and a protrusion 55 provided on the engagement portion 51.

By engaging the engagement portion 51 with the cap lever mounting section 62 of the upper wall portion 61, the cap lever 50 is rotatable about the cap lever mounting section 62.

In FIG. 2, cap levers 50 are disposed at a position that seals the injection port 41*a* of the liquid containers 40K1, 40K2, 40GR, 40C, 40M, and a cap lever 50 is disposed at a position that opens the injection port 41*a* of the liquid container 40Y.

As shown in FIGS. 2, 6, and 7, the cap lever 50 is rotatable between a closed state, in which the injection port 41*a* of the liquid container 40 is sealed, and an opened state, in which the injection port 41*a* of the liquid container 40 is opened.

As shown in FIG. 3, when the cap lever 50 is opened, the injection port 41*a* of the liquid container 40 is opened, and the liquid can be replenished from the refill container 90 to the liquid storage portion 46 of the liquid container 40.

As shown in FIG. 6, the opening and closing cover 31 protects the cap lever 50 and the upper wall portion 61. The opening and closing cover 31 pivots about the opening and closing cover mounting section 63, and can assume a closed state indicated by two-dot chain lines in FIG. 4, in which the six cap levers 50 (not shown) are covered, and an opened state indicated by solid lines in FIG. 4, in which the six cap levers 50 (not shown) are exposed.

As shown in FIG. 4, the opening and closing cover 31 has a restricted portion 31*a*.

When the storage amount of the liquid stored in the liquid storage portion 46 becomes small and the liquid is to be refilled from the refill container 90 to the liquid container 40, the user moves the opening and closing cover 31 from the closed state shown in FIG. 6 to the opened state shown in FIG. 7.

Next, the user hooks his finger on the end 53 of the cap lever 50 to move the cap lever 50 from the closed state to the opened state, thereby changing the injection port 41*a* of the liquid container 40 from the sealed state to the opened state as shown in FIG. 7.

Then, the user inserts the tip end of the refill container 90 into the injection port 41*a* of the liquid container 40, and refills liquid from the refill container 90 to the liquid storage portion 46 of the liquid container 40.

As shown in FIGS. 4, 6, and 7, the injection port 41*a* is disposed in the first recess 64.

Therefore, as shown in FIG. 6, in the closed state of the cap lever 50, the cap 54 is inserted into the first recess 64.

As shown in FIG. 3, when the liquid is refilled from the refill container 90 to the liquid storage portion 46 of the liquid container 40, the tip of the refill container 90 is inserted into the first recess 64.

At this time, the first recess 64 functions as a guide portion that guides the position of the leading end of the refill container 90.

The cap lever mounting section 62 and the opening and closing detection unit 71 are disposed in the second recess 65.

The opening and closing detection unit 71 is provided so as to be able to detect either a closed state or an opened state of the cap lever 50.

Six opening and closing detection units 71 are provided corresponding to the six cap levers 50.

The protrusion 55 of the cap lever 50 functions as a detected portion for detecting one of the closed state and the opened state of the cap lever 50.

The opening and closing detection unit 71 in the present embodiment is a contact type sensor having a movable detection element 71*a*.

A detection element 71*a* is biased in a projecting direction and can be displaced between projecting and retracting. The opening and closing detection unit 71 is not limited to being a contact type sensor, but may also be a limit switch, a pressure sensor, or an angle sensor that detects the rotation angle of the cap lever 50.

In addition, as long as the opening and closing detection unit 71 can detect either of the closed state and the opened state of the cap lever 50, the opening and closing detection unit 71 is not limited to a contact type sensor, but may also be a non-contact type sensor such as a transmissive photosensor or an ultrasonic sensor.

In the present embodiment, as shown in FIG. 6, the detection element 71*a* is pushed by the protrusion 55 to retract in a direction in which the projection amount of the detection element 71*a* becomes small, and by detecting the protrusion 55, the opening and closing detection unit 71 detects the closed state of the cap lever 50.

Further, as shown in FIG. 7, since the detection element 71*a* is not pushed by the protrusion 55 and so protrudes, the opening and closing detection unit 71 does not detect the protrusion 55 and enters a state of detecting the opened state of the cap lever 50.

As shown in FIG. 4, the lock mechanism 72 is provided at a position on the +Z direction side of the upper wall portion 61.

The lock mechanism 72 is provided at a position adjacent in the X-axis direction to and at the −X direction side of the first recess 64 in which the injection port 41*a* of the liquid container 40K1 is disposed.

The lock mechanism 72 is provided so as to be switchable between a locked state, in which the opening and closing cover 31 cannot shift from the closed state to the opened state, and an unlocked state, in which the opening and closing cover 31 can shift from the closed state to the opened state.

The lock mechanism 72 of the present embodiment is a solenoid that moves a lock pin (not shown) linearly by a magnetic force generated by passing an electric current through an electromagnetic coil.

The lock pin is a movable iron core in the solenoid.

The lock pin is provided so that the tip of the lock pin can move between a retracted position located in the lock pin projection hole 66 and a protruding position protruding in the +Y direction from the retracted position.

In the present embodiment, the lock pin at the protruding position restricts the upward movement of the restricted portion 31*a* of the opening and closing cover 31 while in the closed state.

At this time, the opening and closing cover 31 enters a locked state in which the opening and closing cover 31 cannot be shifted from the closed state to the opened state.

Further, the lock pin located in the retracted position does not restrict upward movement of the opening and closing cover 31 in the closed state.

At this time, the opening and closing cover 31 is in an unlocked state in which the opening and closing cover 31 can be shifted from the closed state to the opened state.

In the lock mechanism 72 according to the present embodiment, the lock pin moves from the protruding position to the retracted position by the lock mechanism 72 being energized.

That is, the opening and closing cover 31 is brought into an unlocked state by the lock mechanism 72 being energized, and is brought into a locked state by stopping energization of the lock mechanism 72.

Therefore, the opening and closing cover 31 in the present embodiment is in a locked state in a state in which the power of the recording apparatus 101 is shut off.

Next, an electrical configuration of the recording apparatus 101 will be described.

Figure 11:
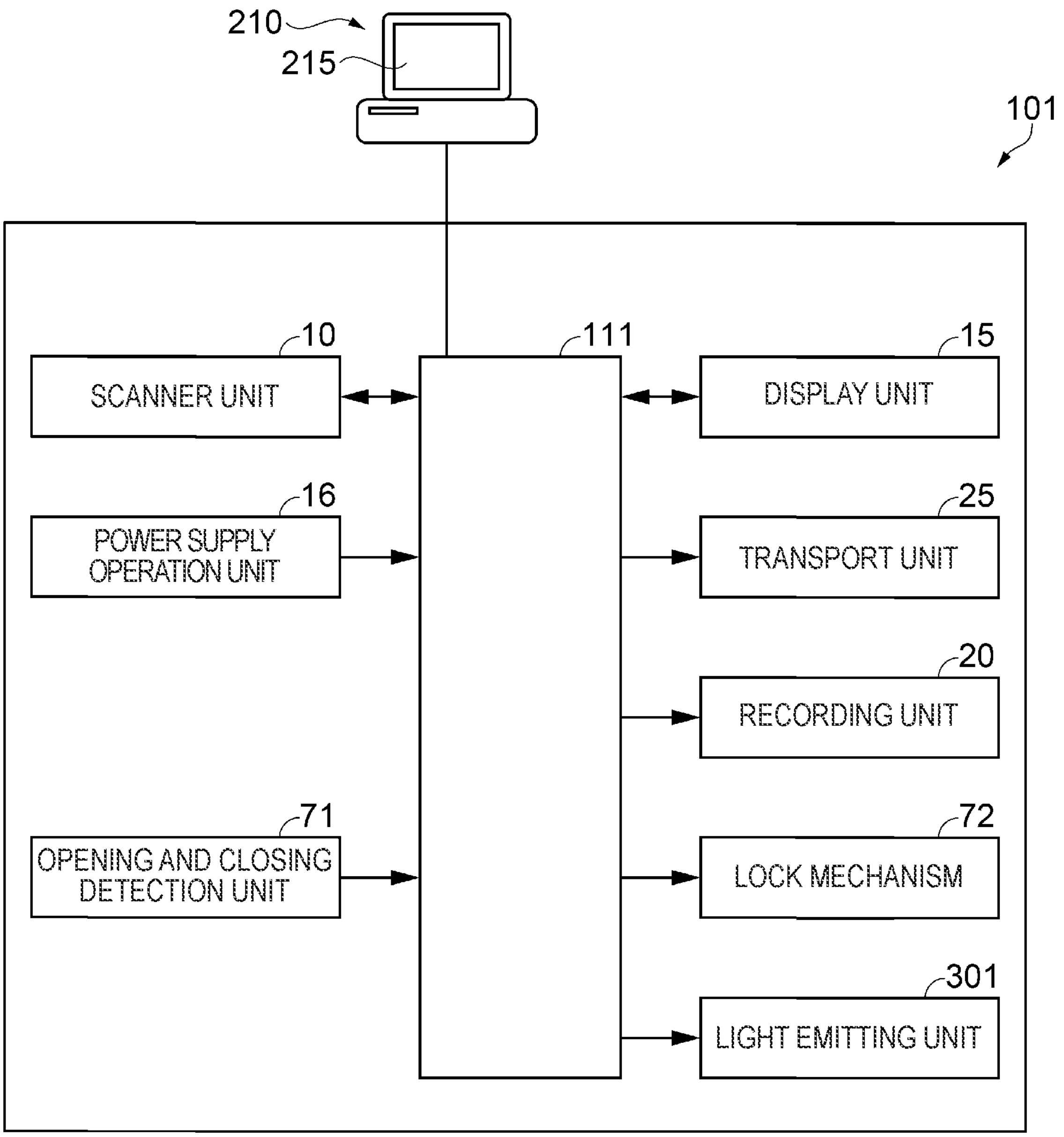
FIG. 11 is a block diagram showing electrical configuration of the recording apparatus.

As shown in FIG. 11, the recording apparatus 101 includes a controller 111.

The scanner unit 10, the power supply operation unit 16, the display unit 15, and the opening and closing detection unit 71 are coupled to the controller 111 via an input interface (not shown).

In addition, the display unit 15, the transport unit 25, the recording unit 20, the lock mechanism 72, and the light emitting unit 301 of the illumination unit 300 are coupled to the controller 111 via an output interface (not shown).

The display unit 15 and a display unit 215 have a function as notification units of displaying to notify about information received together with a display instruction in accordance with the instruction.

Here, the controller 111 is coupled to the display unit 215 of a host device 210, which is an external device, through a communication interface, a communication cable, a wireless communication line, or the like (none of which are shown) in the apparatus main body 102.

The controller 111 transmits data and a signal requesting display of information based on the data, to at least one of the display unit 15 and the host device 210, and performs notification processing for displaying on the display unit 15 and the display unit 215 to notify about the information based on the data.

Examples of the host device 210 include a personal computer, a smartphone, a mobile phone, and a portable information terminal.

The controller 111 includes, for example, an internal CPU and memory (not shown), and performs various controls by the CPU executing a program stored in the memory.

The CPU is an arithmetic processing unit.

The controller 111 has a function of displaying information on either the display unit 15 or the display unit 215 to notify about the information by displaying it.

The controller 111 causes one of the display unit 15 or the display unit 215 to notify about information regarding one of the closed state and the opened state of the cap lever 50 based on a detection result in which the opening and closing detection unit 71 detects one of the closed state and the opened state of the cap lever 50.

In addition, when the opening and closing detection unit 71 detects the opened state of the cap lever 50 while there is an operation for turning off the power supply of the recording apparatus 101, the controller 111 causes one of the display unit 15 or the display unit 215 to notify information requesting that the cap lever 50 be brought into the closed state.

The controller 111 manages the liquid amount in the liquid storage portion 46 of each liquid container 40.

When the user has finished injecting the liquid into the liquid storage portion 46 of the liquid container 40, information on the position of the liquid level in the liquid storage portion 46 is input to the recording apparatus 101 by an operation at the display unit 15 or the host device 210.

The controller 111 acquires the current liquid amount in the liquid storage portion 46 after liquid injection based on the input information related to the position of the liquid level.

In addition, the controller 111 measures the consumption amount of the liquid discharged by the recording unit 20, and subtracts the current consumption amount from the previous liquid amount for each liquid container 40, thereby managing the current liquid amount in the liquid storage portion 46 for each liquid container 40.

The controller 111 controls the recording unit 20 to perform a liquid ejecting operation for ejecting liquid toward a medium transported by the transport unit 25 and a flushing operation that is for ejecting liquid and that is unrelated to printing.

In addition, the controller 111 controls a maintenance device (not shown) to perform a cleaning operation in which liquid is forcibly discharged from the nozzles of the recording head 22.

The recording apparatus 101 includes a carriage motor (not shown) as a driving source that moves the carriage 21 in the width direction of the medium and the controller 111, by liquid ejection control of the recording head 22 and drive control of the carriage motor, performs a liquid ejecting operation of ejecting liquid from the moving recording head 22 mounted on the carriage 21.

The controller 111 controls the transport unit 25 to feed a medium from a medium containing cassette (not shown) and transport the fed medium along a predetermined transport path.

The transport unit 25 includes, for example, a roller-type or belt-type transport mechanism and a transport motor (not shown) serving as a drive source thereof.

The controller 111 performs transport control of a medium by controlling the transport motor.

The controller 111 controls the lock mechanism 72 by controlling energization to the lock mechanism 72 to switch between the locked state, in which the opening and closing cover 31 cannot be shifted from the closed state to the opened state, and the unlocked state, in which the opening and closing cover 31 can be shifted from the closed state to the opened state.

For example, when there is the liquid container 40 in which the amount of liquid in the liquid storage portion 46 has reached the lower limit amount, the controller 111 causes the lock mechanism 72 to transition from the locked state to the unlocked state.

The controller 111 notifies the user of the operating state of the recording apparatus 101 by controlling the light emission state of the light emitting unit 301.

Further, the controller 111 controls the light emission state of the light emitting unit 301, thereby reducing power consumption of the recording apparatus 101.

For example, the controller 111 turns off the light emitting unit 301 during printing and turns on the light emitting unit 301 while printing is not performed.

For example, the controller 111 turns on the light emitting unit 301 when the user operates the power supply operation unit 16 to turn on the power supply of the recording apparatus 101, and turns off the light emitting unit 301 during printing.

In addition, for example, the controller 111 turns on the light emitting unit 301 when operations of the power supply operation unit 16, the display unit 15, the scanner unit 10, the opening and closing cover 31, and the like are performed, and turns off the light emitting unit 301 when no operation is performed for a certain period.

In addition, for example, the controller 111 turns on the light emitting unit 301 when the opening and closing cover 31 is in the opened state, and turns off the light emitting unit 301 when a predetermined time has elapsed after the opening and closing cover 31 is in the closed state.

In addition, for example, when the liquid amount in the liquid storage portion 46 becomes close to the lower limit amount, the controller 111 turns on or blinks the light emitting unit 301.

Accordingly, it is possible to notify the user that the liquid container 40 needs to be refilled.

Further, for example, when the lock mechanism 72 is in the unlocked state, the controller 111 turns on or blinks the light emitting unit 301.

In addition, for example, when there is the liquid container 40 in which the liquid amount in the liquid storage portion 46 has become the lower limit amount, the controller 111 displays this information on the display unit 15 or the display unit 215, and turns on or blinks the light emitting unit 301 corresponding to the liquid storage portion 46 in which the liquid amount became the lower limit amount until the opening and closing cover 31 switches from the opened state to the closed state.

As described above, the recording apparatus 101 according to the first embodiment, the following effects can be obtained.

The recording apparatus 101 includes the liquid storage portion 46 configured to store liquid, the recording head 22 that ejects liquid supplied from the liquid storage portion 46 onto the medium, and the light emitting unit 301 configured to emit light, wherein the liquid storage portion 46 has the float 48 configured to float on the liquid in the liquid storage portion 46 and to move according to movement of the liquid surface LS while maintaining the posture, and the front surface 43F in which the liquid in the liquid storage portion 46 is visually checkable from outside the liquid storage portion 46, wherein the float 48 has the front surface 48*a* that by receiving the light from the light emitting unit 301, appears luminous when viewed from the direction facing the front surface 43F.

According to this, since the float 48 appears luminous, it is easy for the user to check the liquid surface LS.

The light emitting unit 301 is provided outside the liquid storage portion 46, a region facing the light emitting unit 301 in the liquid storage portion 46 is transparent or translucent, and the light emitting unit 301 illuminates the float 48 from outside the liquid storage portion 46.

According to this, it is easy to arrange the light emitting unit 301.

Further, maintenance of the light emitting unit 301 is facilitated.

The float 48 guides the light from the light emitting unit 301 entering the float 48 toward the front surface 48*a*.

According to this, since the float 48 functions as a light guiding member, it is easy to stabilize the light emitting state at the front surface 48*a*.

The float 48 has the rear surface 48*b* into which the light from the light emitting unit 301 enters, and the light emitting unit 301 is provided at a position facing the rear surface 48*b* when the liquid amount of the liquid in the liquid storage portion 46 reaches the lower limit amount.

According to this configuration, since the front surface 48*a* of the float 48 appears luminous when the amount of liquid in the liquid storage portion 46 has reached the lower limit amount, it is possible to notify the user that the amount of liquid in the liquid storage portion 46 has reached the lower limit amount.

The recording apparatus 101 further includes the controller 111 for controlling the turning on and off of the light emitting unit 301.

According to this configuration, the controller 111 can change the light emission state of the float 48 and notify the user of the operation state of the recording apparatus 101 by controlling turning on and off of the light emitting unit 301.

The recording apparatus 101 further includes the injection portion 41 that enables injection of the liquid into the liquid storage portion 46.

According to this configuration, the liquid storage portion 46 can also be employed in a refill-type recording apparatus 101 that is used by refilling with liquid.

2. Second Embodiment

Next, the liquid accommodation unit 103 of the recording apparatus 101 according to a second embodiment as an embodiment of present disclosure will be described.

Note that portions common to those of the liquid accommodation unit 103 of the first embodiment are denoted by the same reference numerals, and the description thereof is omitted.

In addition, the description of actions and effects similar to those of the first embodiment will also be omitted.

Figure 12:
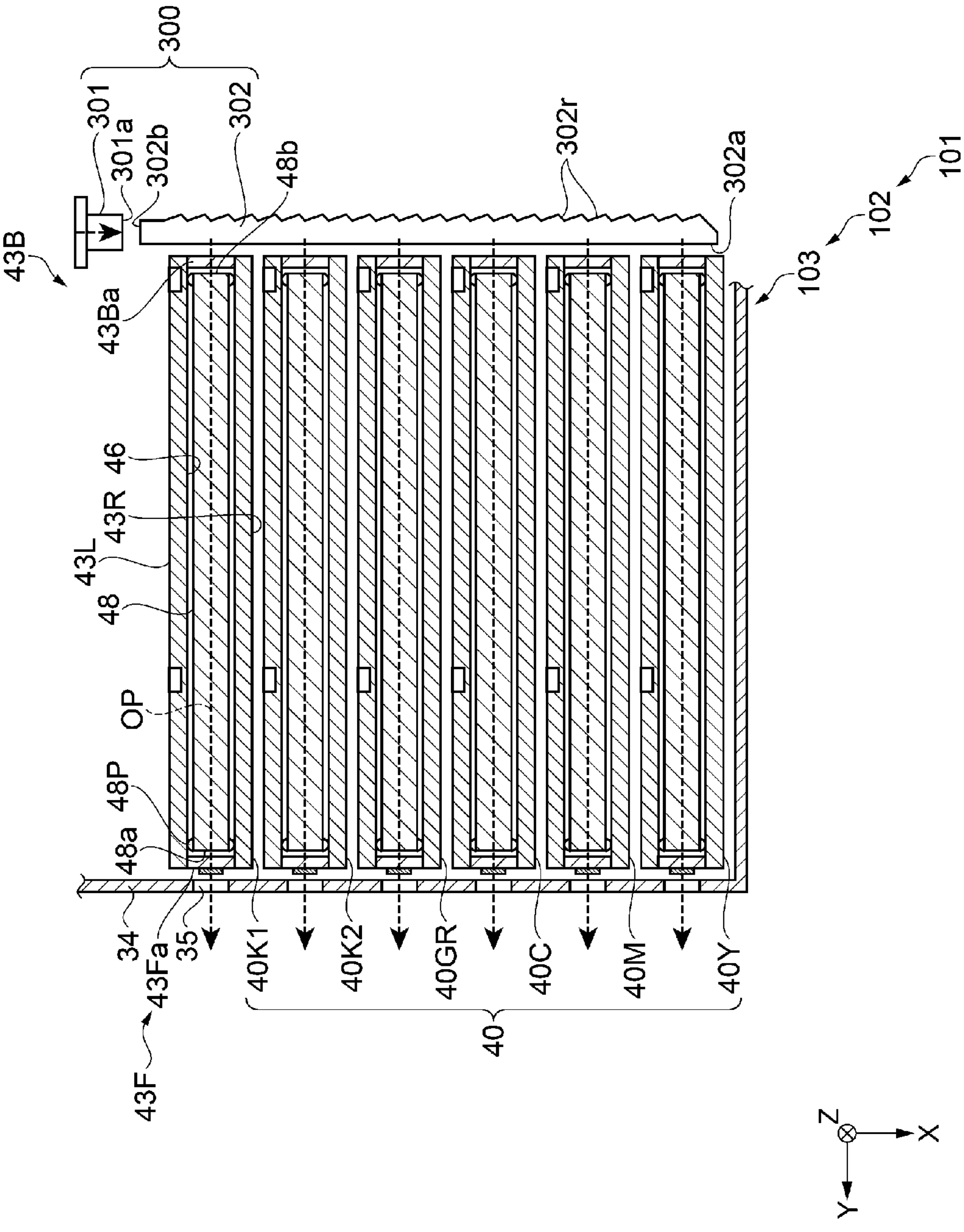
FIG. 12 is a main-part cross-sectional view of a liquid storage portion according to a second embodiment.

As shown in FIG. 12, the liquid accommodation unit 103 of the second embodiment differs from the liquid accommodation unit 103 of the first embodiment in that the illumination unit 300 includes a light guide portion 302 and that there is one light emitting unit 301.

The light emitting unit 301 is provided at a position to the −Y direction side of the six liquid containers 40 and at a position to the −X direction side of the rear surface 43B of the liquid storage portion 46 in the liquid container 40K1.

The light emitting unit 301 of the present embodiment is provided so that light emitted from the front surface 301*a* is directed in the +X direction.

The light guide portion 302 is made of a translucent or transparent material.

The light guide portion 302 includes a light entry surface 302*b*, an irradiation surface 302*a*, and a rear surface 302*r*.

The light guide portion 302 of the present embodiment is a light guiding member for guiding light that enters from the light entry surface 302*b* toward the irradiation surface 302*a*.

For example, if the material constituting the light guide portion 302 is a resin material, polypropylene (PP), polyethylene (PE), polyamide (PA), acrylonitrile-butadiene-styrene (ABS), polycarbonate (PC), polyethylene terephthalate (PET), polymethylmethacrylate (PMMA), or the like can be adopted.

The light entry surface 302*b* is a side surface of the light guide portion 302 on the −X direction side, and is provided at a position facing the front surface 301*a* of the light emitting unit 301.

The light entry surface 302*b* is located on the −X direction side of the rear surface 43B of the liquid storage portion 46 in the liquid container 40K1.

The irradiation surface 302*a* is a side surface on the +Y direction side of the light guide portion 302.

The irradiation surface 302*a* extends from a position on the −X direction side of the rear surface 43B of the liquid storage portion 46 in the liquid container 40K1 to a position on the +X direction side of the rear surface 43B of the liquid storage portion 46 in the liquid container 40Y.

The irradiation surface 302*a* is provided at positions facing the window member 43Ba of the liquid storage portion 46 in each liquid container 40K1, 40K2, 40GR, 40C, 40M, 40Y.

The irradiation surface 302*a* is provided in the Z-axis direction to correspond to the position of the lower limit liquid level LL in the liquid storage portion 46.

As a result, when the amount of liquid in the liquid storage portion 46 is at the lower limit, the irradiation surface 302*a* faces the rear surface 48*b* of the float 48.

The rear surface 302*r* is a side surface of the light guide portion 302 on the −Y direction side.

The rear surface 302*r* extends from a position on the −X direction side of the rear surface 43B of the liquid storage portion 46 in the liquid container 40K1 to a position on the +X direction side of the rear surface 43B of the liquid storage portion 46 in the liquid container 40Y.

The rear surface 302*r* is formed by a plurality of reflection surfaces and has a saw blade shape extending in the X-axis direction.

As shown in FIG. 12, light emitted from the front surface 301*a* of the light emitting unit 301 enters the light guide portion 302 from the light entry surface 302*b* of the light guide portion 302.

Light from the light emitting unit 301 that enters the light guide portion 302 from the light entry surface 302*b*, is guided toward the irradiation surface 302*a* of the light guide portion 302 by the plurality of reflection surfaces that configure the rear surface 302*r*, by the side surface of the light guide portion 302 in the +Z direction, and by the side surface in the −Z direction.

The light from the light emitting unit 301 guided to the irradiation surface 302*a* enters the liquid storage portion 46 through the window member 43Ba, and illuminates the inside of the six liquid storage portions 46 including the liquid and the floats 48.

In other words, the light emitting unit 301 is provided outside the liquid storage portion 46 and illuminates the float 48 via the light guide portion 302.

Further, in the recording apparatus 101 of the present embodiment, the floats 48 in the plurality of liquid storage portions 46 are illuminated by one light emitting unit 301 via the light guide portion 302.

In addition, when the amount of liquid in the liquid storage portion 46 at this time is the lower limit amount, the light from the light emitting unit 301 guided to the irradiation surface 302*a* enters the float 48 from the rear surface 48*b* of the float 48 and is guided in the float 48 toward the front surface 48*a*.

In FIG. 12, the optical paths OP guided from the rear surface 48*b* toward the front surface 48*a* in the six floats 48 are indicated by dashed arrows.

The light guided to the front surface 48*a* of the float 48 passes through the window member 43Fa of the liquid storage portion 46 and reaches the +Y direction side of the liquid storage portion 46, that is, outside the liquid storage portion 46.

As a result, when the inside of the liquid storage portion 46 is viewed from the +Y direction, which is from a direction facing the front surface 43F of the liquid storage portion 46, the front surface 48*a* of the float 48 appears luminous.

As described above, according to the recording apparatus 101 according to the second embodiment, the following effects can be obtained.

The recording apparatus 101 further includes the light guide portion 302 that guides the light from the light emitting unit 301, and the light emitting unit 301 is provided outside the liquid storage portion 46 and illuminates the float 48 via the light guide portion 302.

According to this, in the recording apparatus 101, the light emitting unit 301 can be provided at a position separated from the liquid storage portion 46.

The light guide portion 302 has the irradiation surface 302*a* for irradiating light from the light emitting unit 301 toward the float 48, the float 48 has the rear surface 48*b* into which the light irradiated from the irradiation surface 302*a* enters, and the irradiation surface 302*a* is provided at a position facing the rear surface 48*b* when the liquid amount in the liquid storage portion 46 becomes a lower limit amount.

According to this, it is possible to notify the user that the liquid amount in the liquid storage portion 46 reached a predetermined amount.

The recording apparatus 101 includes a plurality of liquid storage portions 46, and the floats 48 in the plurality of liquid storage portion 46 are illuminated by one light emitting unit 301 via the light guide portion 302.

According to this, the plurality of floats 48 can be illuminated by one light emitting unit 301.

3. Third Embodiment

Next, the liquid accommodation unit 103 in the recording apparatus 101 of a third embodiment as an embodiment of the present disclosure will be described.

Note that portions common to those of the liquid accommodation unit 103 of the first embodiment are denoted by the same reference numerals, and the description thereof is omitted.

In addition, the description of actions and effects similar to those of the first embodiment will also be omitted.

As shown in FIG. 13, the liquid accommodation unit 103 of the third embodiment differs from the liquid accommodation unit 103 of the first embodiment in that the liquid storage portion 46 of the liquid container 40 includes a float 448, a float guide 46G, and a window member 43Sa, does not include the window member 43Ba, and the illumination unit 300 includes a light guide portion 303.

As shown in FIG. 13, the liquid storage portion 46 of the present embodiment includes the float 448, the float guide 46G, and the window member 43Sa.

The float 448 floats on the liquid in the liquid storage portion 46 and moves according to the movement of the liquid surface LS in the Z-axis direction.

The float 448 includes a bottom surface 448*b* which is a side surface in the +Z direction, a reflection surface 448*r* which is an inclined surface located in the −Z direction from the bottom surface 448*b*, and a front surface 448*a* which is a side surface located in the +Y direction from the bottom surface 448*b* and the reflection surface 448*r*.

In the present embodiment, the inclination angle of the reflection surface 448*r* with respect to the X-Y plane is 45 degrees.

The material constituting the float 448 of the present embodiment is the same as the material of the float 48 of the first embodiment.

Therefore, a portion of the reflection surface 448*r* of the float 448 is located in the −Z direction with respect to the liquid surface LS.

Further, a portion of the front surface 448*a* of the float 448 is positioned in the −Z direction with respect to the liquid surface LS.

As in the first embodiment, the float 448 of the present embodiment has a function as a light guiding member that guides light entering from the bottom surface 448*b* to the front surface 448*a* of the float 448.

The float guide 46G of the liquid storage portion 46 guides the float 448 so as to move in accordance with the movement of the liquid surface LS in the Z-axis direction while maintaining a state in which the front surface 448*a* is along the X-Z plane.

The float guide 46G is spaced apart from the front surface 43F so that the float 448 is positioned between the front surface 43F and the float guide 46G in the Y-axis direction.

The float guide 46G is a pair provided to the −X direction side of the right side surface 43R and to the +X direction side of the left side surface 43L, and are protrusions extending in the Z-axis direction.

The pair of float guides 46G are provided separated from each other by an interval in the X-axis direction.

Therefore, in the liquid storage portion 46, a region on the +Y direction side of the float guide 46G and a region on the −Y axis direction side of the float guide 46G are continuous without being interrupted by the float guide 46G.

The window member 43Sa is provided on the bottom surface 43S of the liquid storage portion 46 at a position facing the bottom surface 448*b* of the float 448.

Further, the window member 43Sa is provided at a position facing an irradiation surface 303*a* (to be described later) of the light guide portion 303.

The window member 43Sa is composed of a translucent or transparent material.

As a material constituting the window member 43Sa, a similar material as that of the window member 43Ba of the first embodiment can be adopted.

When the liquid storage portion 46 is formed of a translucent or transparent material, the window member 43Sa may not be provided.

The light guide portion 303 is made of a translucent or transparent material.

The light guide portion 303 includes a light entry surface 303*b*, the irradiation surface 303*a*, and reflection surfaces 303*r*1, 303*r*2, 303*r*3.

The light guide portion 303 of the present embodiment is a light guiding member for guiding light that enters from the light entry surface 303*b* toward the irradiation surface 303*a*.

As a material constituting the light guide portion 303, a resin material similar to that of the light guide portion 302 of the second embodiment can be adopted.

In the present embodiment, the inclination angle of the reflection surfaces 303*r*1, 303*r*2, 303*r*3 with respect to the X-Y plane is 45 degrees.

The light entry surface 303*b* is provided at a position facing the front surface 301*a* of the light emitting unit 301.

The light entry surface 303*b* is located on the −Y direction side of the rear surface 43B of the liquid storage portion 46.

The reflection surface 303*r*1 is located in the +Y direction from the light entry surface 303*b* and on the −Y direction side of the rear surface 43B of the liquid storage portion 46.

The reflection surface 303*r*2 is located in the +Z direction from the reflection surface 303*r*1 and on the +Z direction side in the Z-axis direction from the bottom surface 43S of the liquid storage portion 46.

The reflection surface 303*r*3 is located on the +Y direction of the reflection surface 303*r*2 and on the +Z direction side of the window member 43Sa of the liquid storage portion 46.

The irradiation surface 303*a* is located on the −Z direction side of the reflection surface 303*r*3 and is located on the +Z direction side of the window member 43Sa of the liquid storage portion 46.

The irradiation surface 303*a* faces the window member 43Sa of the liquid storage portion 46.

As a result, the irradiation surface 303*a* faces the bottom surface 448*b* of the float 448.

As shown in FIG. 13, when the amount of liquid in the liquid storage portion 46 is the lower limit amount, light emitted from the front surface 301*a* of the light emitting unit 301 enters the light guide portion 303 from the light entry surface 303*b* of the light guide portion 303.

The light from the light emitting unit 301 that entered the light guide portion 303 from the light entry surface 303*b* is guided by the side surface of the light guide portion 303, including the reflection surfaces 303*r*1, 303*r*2, 303*r*3, so as to be directed toward the irradiation surface 303*a* in the light guide portion 303.

The light from the light emitting unit 301 that was guided to the irradiation surface 303*a* passes through the window member 43Sa and enters the liquid storage portion 46 to illuminate the inside of the liquid storage portion 46 including the liquid and the float 448.

In other words, the light emitting unit 301 is provided outside the liquid storage portion 46 and illuminates the float 448 via the light guide portion 303.

Further, the light from the light emitting unit 301 guided to the irradiation surface 303*a* enters into the float 448 from the bottom surface 448*b* of the float 448, and is guided by the side surface of the float 448, including the reflection surface 448*r*, so as to be directed toward the front surface 448*a* of the float 448.

In FIG. 13, the optical path OP in which light from the light emitting unit 301 travels from the light entry surface 303*b* of the light guide portion 303 to the +Y direction side of the visual check member 34*a* of the liquid accommodation unit 103 is indicated by a dashed arrow.

The light guided to the front surface 448*a* of the float 448 passes through the window member 43Fa of the liquid storage portion 46 and reaches the +Y direction side of the liquid storage portion 46, which is outside the liquid storage portion 46.

As a result, when the inside of the liquid storage portion 46 is viewed from the +Y direction, which is from a direction facing the front surface 43F of the liquid storage portion 46, the front surface 448*a* of the float 448 appears luminous.

The front surface 448*a* is an example of a light emitting surface.

In the present embodiment, even when the amount of liquid in the liquid storage portion 46 is not the lower limit amount, for example, when the amount of liquid is the upper limit amount, light from the light emitting unit 301 that was guided to the irradiation surface 303*a* and that entered the liquid storage portion 46, will enter into the float 448 from the bottom surface 448*b* of the float 448 via the liquid in the liquid storage portion 46, although the amount of light is less than when the amount of liquid is the lower limit amount.

Therefore, in the present embodiment, when the inside of the liquid storage portion 46 is viewed from the +Y direction, which is from a direction facing the front surface 43F of the liquid storage portion 46, the front surface 448*a* of the float 448 appears luminous, regardless of the amount of liquid in the liquid storage portion 46.

According to this configuration, by the controller 111 turning on or blinking the light emitting unit 301, the float 448 appears luminous regardless of the amount of liquid in the liquid storage portion 46, and thus it is easy for the user to check the liquid surface LS.

4. Fourth Embodiment

Next, the liquid accommodation unit 103 in the recording apparatus 101 of a fourth embodiment as an embodiment of the present disclosure will be described.

Note that portions common to those of the liquid accommodation unit 103 of the first embodiment are denoted by the same reference numerals, and the description thereof is omitted.

In addition, the description of actions and effects similar to those of the first embodiment will also be omitted.

As shown in FIG. 14, the liquid accommodation unit 103 of the fourth embodiment is different from the liquid accommodation unit 103 of the first embodiment in that the liquid storage portion 46 of the liquid container 40 includes a float 548 and the float guide 46G, does not include the window member 43Ba, and the light emitting unit 301 is provided inside the float 548.

As shown in FIG. 14, the liquid storage portion 46 of the present embodiment includes the float 548 and the float guide 46G.

The float 548 floats in the liquid in the liquid storage portion 46 and moves according to the movement of the liquid surface LS in the Z-axis direction.

The float 548 includes the light emitting unit 301 and a secondary coil 301C for supplying power to the light emitting unit 301.

The light emitting unit 301 is provided in the float 548 in a posture in which the front surface 301*a* faces a front surface 548*a*, which is a side surface of the float 548 on the +Y direction side.

The secondary coil 301C is a power receiver coil in wireless charging that uses electromagnetic induction.

By supplying power received by the secondary coil 301C to the light emitting unit 301, the light emitting unit 301 emits light.

The secondary coil 301C is provided in the float 548 so as to face the right side surface 43R of the liquid storage portion 46.

A primary coil (not shown) is provided on the right side surface 43R of the liquid storage portion 46.

The primary coil is the power transmitter coil in wireless charging, and is supplied with an AC voltage under the control of the controller 111.

The primary coil is provided over a region facing the secondary coil 301C, which moves with the movement of the float 548 in the Z-axis direction.

The float 548 of the present embodiment is made of a translucent or transparent material.

As a material constituting the float 548, a resin material similar to that of the float 48 of the first embodiment can be adopted.

The float 548 floats on the liquid in the liquid storage portion 46.

At this time, a portion of the front surface 548*a* of the float 548 is positioned in the −Z direction with respect to the liquid surface LS.

The float guide 46G of the liquid storage portion 46 guides the float 548 so that it moves in accordance with the movement of the liquid surface LS in the Z-axis direction, while maintaining a state in which the front surface 548*a* is along the X-Z plane.

The float guide 46G is spaced apart from the front surface 43F so that the float 548 is positioned between the front surface 43F and the float guide 46G in the Y-axis direction.

The float guide 46G is a pair provided to the −X direction side of the right side surface 43R and to the +X direction side of the left side surface 43L, and are protrusions extending in the Z-axis direction.

The pair of float guides 46G are provided separated from each other by an interval in the X-axis direction.

Therefore, in the liquid storage portion 46, a region on the +Y direction side of the float guide 46G and a region on the −Y axis direction side of the float guide 46G are continuous without being interrupted by the float guide 46G.

Under the control of the controller 111, an AC voltage is supplied to the primary coil so that the secondary coil 301C receives electric power and the light emitting unit 301 emits light in the +Y direction.

The front surface 548*a* of the float 548 receives light from the light emitting unit 301 from the inside of the float 548.

The light from the light emitting unit 301 passes through the front surface 548*a* of the float 548 and travels in the +Y direction.

In FIG. 14, an optical path OP in which the light from the light emitting unit 301 is directed to the +Y direction side from the visual check member 34*a* of the liquid accommodation unit 103 is indicated by a dashed arrow.

The light that has passed through the front surface 548*a* of the float 548 passes through the window member 43Fa of the liquid storage portion 46 and reaches the +Y direction side of the liquid storage portion 46, which is outside the liquid storage portion 46.

As a result, when the inside of the liquid storage portion 46 is viewed from the +Y direction, which is from a direction facing the front surface 43F of the liquid storage portion 46, the front surface 548*a* of the float 548 appears luminous.

The front surface 548*a* is an example of a light emitting surface.

In the present embodiment, when the inside of the liquid storage portion 46 is viewed from the +Y direction, which is from a direction facing the front surface 43F of the liquid storage portion 46, the front surface 548*a* of the float 548 appears luminous, regardless of the amount of liquid in the liquid storage portion 46.

According to this configuration, by the controller 111 turning on or blinking the light emitting unit 301, the float 548 appears luminous regardless of the amount of liquid in the liquid storage portion 46, and thus it is easy for the user to visually check the liquid surface LS.

As described above, according to the recording apparatus 101 and the liquid container 40 according to the fourth embodiment, the following effects can be obtained.

In the recording apparatus 101, the light emitting unit 301 is provided inside the float 548, and the front surface 548*a* is transparent or translucent and receives light from the light emitting unit 301 from the inside of the float 548.

According to this configuration, the recording apparatus 101 can easily stabilize the light emitting state of the front surface 548*a* of the float 548 regardless of the position of the float 548 in the Z-axis direction.

Therefore, the user can easily check the liquid surface LS.

The liquid container 40 includes the liquid storage portion 46 configured to store liquid, the float 548 floating on the liquid in the liquid storage portion 46 and movable according to the movement of the liquid surface LS while maintaining the posture, the front surface 43F from which the liquid in the liquid storage portion 46 is visually checkable from outside of the liquid storage portion 46, and the light emitting unit 301 provided inside the float 548, wherein the float 548 has the front surface 548*a* that, due to the light emitting unit 301 emitting light, appears luminous when viewed from a direction facing the front surface 43F.

According to this configuration, the liquid container 40 can easily stabilize the light emitting state of the front surface 548*a* of the float 548 regardless of the position of the float 548 in the Z-axis direction.

Therefore, the user can easily check the liquid surface LS.

5. Fifth Embodiment

Next, the liquid accommodation unit 103 in the recording apparatus 101 of a fifth embodiment as one embodiment of the present disclosure will be described.

Note that portions common to those of the liquid accommodation unit 103 of the first embodiment are denoted by the same reference numerals, and the description thereof is omitted.

In addition, the description of actions and effects similar to those of the first embodiment will also be omitted.

As shown in FIG. 15, the liquid accommodation unit 103 of the fifth embodiment differs from the liquid accommodation unit 103 of the first embodiment in that the liquid storage portion 46 of the liquid container 40 includes a float 648 and a window member 43Ua and does not include the window member 43Ba.

As shown in FIG. 15, the liquid storage portion 46 of the present embodiment includes the float 648 and the window member 43Ua.

The float 648 floats on the liquid in the liquid storage portion 46 and moves according to the movement of the liquid surface LS in the Z-axis direction.

The float 648 has a front surface 648*r* which is a side face positioned to the +Y direction side.

The front surface 648*r* is an inclined surface that reflects light received from the −Z direction side of the float 648 toward the +Y direction of the float 648.

The inclination angle of the front surface 648*r* with respect to the X-Y plane in the present embodiment is 45 degrees.

The material constituting the float 648 of the present embodiment may be the same resin material as of the float 48 of the first embodiment, but may not be translucent or transparent.

For example, the material constituting the float 648 may be white, or the surface of the float 648 may be subjected to stainless steel vapor deposition.

The float 648 floats on the liquid in the liquid storage portion 46.

At this time, a part of the front surface 648*r* of the float 648 is located on the −Z direction side with respect to the liquid surface LS.

The window member 43Ua is provided at a position in the −Z direction side of the front surface 648*r* of the float 648 on the upper surface 43U of the liquid storage portion 46, and faces the front surface 648*r*.

The window member 43Ua is made of a translucent or transparent material.

As a material constituting the window member 43Ua, a material similar to that of the window member 43Ba of the first embodiment can be adopted.

When the liquid storage portion 46 is formed of a translucent or transparent material, the window member 43Ua may not be provided.

The light emitting unit 301 of the illumination unit 300 is provided at a position on the −Z direction side of the window member 43Ua, and the front surface 301*a* faces the window member 43Ua.

The front surface 301*a* of the light emitting unit 301 is provided at a position in the −Z direction of the front surface 648*r* of the float 648, and faces the front surface 648*r* via the window member 43Ua.

The light emitting unit 301 of the present embodiment is attached to the upper surface 43U of the liquid storage portion 46, but may be attached to the housing 30.

As shown in FIG. 15, light emitted from the front surface 301*a* of the light emitting unit 301 enters the liquid storage portion 46 through the window member 43Ua, and illuminates the inside of the liquid storage portion 46, including the float 648.

In other words, the light emitting unit 301 is provided outside the liquid storage portion 46 and illuminates the inside of the liquid storage portion 46 from outside the liquid storage portion 46.

The light emitted in the +Z direction from the front surface 301*a* of the light emitting unit 301 enters the liquid storage portion 46 via the window member 43Ua and reaches the front surface 648*r* of the float 648.

The light from the light emitting unit 301 received by the front surface 648*r* of the float 648 is reflected by the front surface 648*r*, travels in the +Y direction, passes through the window member 43Fa of the liquid storage portion 46, and reaches the +Y direction side of the liquid storage portion 46, which is outside the liquid storage portion 46.

As a result, when the inside of the liquid storage portion 46 is viewed from the +Y direction, which is from a direction facing the front surface 43F of the liquid storage portion 46, the front surface 648*r* of the float 648 appears luminous.

The front surface 648*r* is an example of a light emitting surface.

In the present embodiment, when the inside of the liquid storage portion 46 is viewed from the +Y direction side, which is from a direction facing the front surface 43F of the liquid storage portion 46, the front surface 648*r* of the float 648 appears luminous, regardless of the amount of liquid in the liquid storage portion 46.

According to this configuration, by the controller 111 turning on or blinking the light emitting unit 301, the float 648 appears luminous regardless of the amount of liquid in the liquid storage portion 46, and thus the user easily recognizes the liquid surface LS.

Although the recording apparatus 101 and the liquid container 40 according to the above embodiments of the present disclosure have the above-described configuration as a basis, it is of course possible to change or omit configuration partially within a range that does not depart from the gist of the present disclosure.

In addition, the above-described embodiments and other embodiments described below can be implemented in combination with each other within a range that does not technically conflict.

Other embodiments will be described below.

The housing 30 of the liquid accommodation unit 103 in the embodiments described above, may not include the visual check portion 34 and the wall portion 36.

In addition, for example, the housing 30 of the liquid accommodation unit 103 may function as a mounting section that detachably accommodates a replaceable liquid container 40.

In this case, for example, the liquid container 40, according to the first embodiment, is the liquid container 40 attachable to the housing 30 of the recording apparatus 101 including the recording head 22 that ejects the liquid, the light emitting unit 301 that emits light, and the housing 30. The liquid container 40 has the liquid storage portion 46 configured to store liquid, the float 48 that floats on the liquid in the liquid storage portion 46 and is movable according to the movement of the liquid surface LS of the liquid while maintaining the posture, and the front surface 43F through which the liquid in the liquid storage portion 46 is visually checkable from outside the liquid storage portion 46, wherein in a state of being mounted on the housing 30, the region of the liquid storage portion 46 facing the light emitting unit 301 is transparent or translucent, and the float 48 has the front surface 48*a* that, by receiving light from the light emitting unit 301, and appears luminous when viewed from the direction facing the front surface 43F.

According to this, in the state in which the liquid container 40 is mounted in the housing 30, since the float 48 appears luminous, the user can easily check the liquid surface LS.

Note that in a case where the light emitting unit 301 is provided on the upper surface 43U of the liquid storage portion 46 as in the fifth embodiment, the recording apparatus 101 may not include the light emitting unit 301.

With respect to the first embodiment, the light emitting unit 301 may be provided such that the position in the Z-axis direction of the front surface 301*a* corresponds to the position of the upper limit liquid level LH of liquid in the liquid storage portion 46.

Also, the window member 43Ba may be provided at the rear surface 43B of the liquid storage portion 46 at a position facing the front surface 301*a* of the light emitting unit 301.

According to this, when the user refills the liquid container 40 with liquid, it is possible to notify that the liquid amount in the liquid storage portion 46 is at the upper limit by the controller 111 turning on or blinking the light emitting unit 301.

In the embodiments described above, a plurality of light emitting units 301 may be provided for one liquid storage portion 46.

For example, the first embodiment may be provided with the light emitting unit 301 in which the position of the front surface 301*a* in the Z-axis direction corresponds to the position of the lower limit liquid level LL in the liquid storage portion 46, and the light emitting unit 301 in which the position of the front surface 301*a* in the Z-axis direction corresponds to the position of the upper limit liquid level LH in the liquid storage portion 46.

Further, for example, in addition to the light emitting unit 301 in the first embodiment in which the position of the front surface 301*a* in the Z-axis direction corresponds to the position of the lower limit liquid level LL of the liquid in the liquid storage portion 46, a light emitting unit 301 may be provided at the upper surface 43U of the liquid storage portion 46, that obliquely illuminates, from above in the −Y direction, a region of the upper surface of the float 48 that is further to the +Y direction side than the center is.

When the controller 111 turns on or blinks the light emitting unit 301, the upper surface of the float 48 will appear luminous when the inside of the liquid storage portion 46 is viewed from the +Y direction, which is from the direction facing the front surface 43F of the liquid storage portion 46.

At this time, the upper surface of the float 48 is an example of a light emitting surface.

In the second embodiment described above, the window member 43Ba may be formed so as to extend over the Z-axis direction of the rear surface 43B of the liquid storage portion 46.

The irradiation surface 302*a* may be formed to extend in the Z-axis direction of the rear surface 43B of the liquid storage portion 46 such that the irradiation surface 302*a* of the light guide portion 302 faces the rear surface 48*b* of the float 48, with the window member 43Ba disposed therebetween, regardless of the position of the liquid surface LS of the liquid in the liquid storage portion 46.

According to this configuration, when the controller 111 turns on or blinks the light emitting unit 301, the front surface 48*a* of the float 48 appears luminous when the inside of the liquid storage portion 46 is viewed from the +Y direction which faces the front surface 43F of the liquid storage portion 46, regardless of the amount of liquid in the liquid storage portion 46.

In other words, even when the liquid surface LS in the liquid storage portion 46 and the position of the float 48 change, by the controller 111 turning on or blinking the light emitting unit 301, the front surface 48*a* of the float 48 appears luminous when the inside of the liquid storage portion 46 is viewed from the +Y direction, which is from the direction facing the front surface 43F of the liquid storage portion 46.

In the above embodiments, the float 48 may be composed of a plurality of materials as long as the float 48 floats on the liquid in the liquid storage portion 46.

For example, the front surface 648*r* of the float 648 in the fifth embodiment may be made of stainless steel and the other portions may be made of polypropylene (PP).

In the above embodiments, the shape of the float is not particularly limited as long as it has a light emitting surface.

For example, the float 48 of the first embodiment may have a cylindrical shape with a circular front surface 48*a* or a prismatic shape with a triangular front surface 48*a*.

Further, for example, the float 648 of the fifth embodiment may be formed into a spherical body, and the float guide 46G may be provided as in the third embodiment.

In the above-described embodiments, the color of the light emitted by the light emitting unit 301 may be changeable, and the color when the controller 111 turns on or blinks the light emitting unit 301 may be changed.

For example, in the first embodiment, the controller 111 may cause the light emitting unit 301 to emit green light when the liquid amount in the liquid storage portion 46 is larger than the lower limit amount, and may cause the light emitting unit 301 to blink with a yellow light when the liquid amount in the liquid storage portion 46 reaches the lower limit amount.

In addition, for example, when the liquid amount of liquid in the liquid storage portion 46 becomes smaller than the lower limit amount, the controller 111 may cause the light emitting unit 301 to emit red light.

In the third embodiment, the six liquid storage portions 46 including the liquid and the float 448 may be illuminated through the light guide portion 303 by a single light emitting unit 301.

In this case, for example, the six irradiation surfaces 303*a* facing the window member 43Sa of each liquid storage portion 46 may be provided by branching the light guide portion 303 before it reaches the irradiation surfaces 303*a*.

In the above-described embodiments, when the illumination unit 300 includes a plurality of light emitting units 301, the colors of visible light emitted by the respective light emitting units 301 may be different.

In the above embodiments, each float in the plurality of liquid storage portions 46 may be different in color.

In the third embodiment described above, the liquid accommodation unit 103 may not include the light emitting unit 301.

In this case, for example, the light emitting unit 301 may be provided in the apparatus main body 102 at a position on the −Y direction side of the liquid accommodation unit 103, or may be provided at a position on the −X direction side of the liquid accommodation unit 103.

In the fourth embodiment, instead of the secondary coil 301C, the float 548 may include a battery capable of supplying electric power to the light emitting unit 301.

In the embodiments described above, the recording head 22 and the liquid container 40 may not be coupled by the tube 23.

In this case, the recording apparatus 101 may record a desired image on the medium by mounting the recording head 22 and the liquid container 40 on the carriage 21 and alternately repeating a liquid ejecting operation, in which the recording head 22 ejects liquid onto the medium while the carriage 21 moves in the width direction of the medium, and a transport operation, in which the medium is transported in the transport direction by the transport unit 25.

What is claimed is:

1. A recording apparatus comprising:

a plurality of liquid storage portions, wherein each of the plurality of liquid storage portions is configured to store liquid;

a recording head that ejects the liquid supplied from at least one of the plurality of liquid storage portions onto a medium;

a single light emitting unit configured to emit light;

a light guide portion configured to guide the light from the single light emitting unit; and a plurality of floats, wherein each of the plurality of floats is configured to float on the liquid in a corresponding liquid storage portion of the plurality of liquid storage portions and to move according to movement of a liquid surface of the liquid while maintaining a posture, wherein each of the plurality of liquid storage portions includes a visual check surface through which the liquid in the corresponding liquid storage portion is visually checkable from outside the corresponding liquid storage portion, each of the plurality of floats has a light emitting surface that by receiving the light from the single light emitting unit, appears luminous when viewed from a direction facing the visual check surface, and the single light emitting unit is provided outside the plurality of liquid storage portions and illuminates the plurality of floats via the light guide portion.

2. The recording apparatus according to claim 1, wherein the light emitting surface is transparent or translucent.

3. The recording apparatus according to claim 1, wherein a region of each of the plurality of liquid storage portions facing the single light emitting unit is transparent or translucent.

4. The recording apparatus according to claim 1, wherein each of the plurality of floats has a light entry surface into which the light from the single light emitting unit enters.

5. The recording apparatus according to claim 1, wherein the light guide portion has an irradiation surface for irradiating the light from the single light emitting unit toward the plurality of floats, each of the plurality of floats has a light entry surface into which the light irradiated from the irradiation surface enters, and the irradiation surface is provided at a position that faces the light entry surface when a liquid amount in the at least one of the plurality of liquid storage portions becomes a predetermined amount.

6. The recording apparatus according to claim 1, further comprising:

a controller configured to control turning on and off of the single light emitting unit.

7. The recording apparatus according to claim 1, further comprising:

a plurality of injection portions through which the liquid is injectable into the plurality of liquid storage portions.

* * * * *